United States Patent
Mochizuki et al.

(10) Patent No.: US 7,876,243 B2
(45) Date of Patent: Jan. 25, 2011

(54) TRANSMISSION DEVICE AND TRANSMISSION METHOD, INFORMATION PROCESSING DEVICE AND INFORMATION PROCESSING METHOD, AND PROGRAM

(75) Inventors: Shunsuke Mochizuki, Tokyo (JP); Masato Kikuchi, Tokyo (JP); Masahiro Yoshioka, Tokyo (JP); Ryosuke Araki, Tokyo (JP); Masaki Handa, Kanagawa (JP); Takashi Nakanishi, Tokyo (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 12/330,706

(22) Filed: Dec. 9, 2008

(65) Prior Publication Data

US 2009/0174584 A1    Jul. 9, 2009

(30) Foreign Application Priority Data

Jan. 8, 2008    (JP) .............................. 2008-000972

(51) Int. Cl.
*H03M 13/00*    (2006.01)
(52) U.S. Cl. .............................. 341/94; 341/50; 341/51; 455/419
(58) Field of Classification Search .................. 341/94, 341/50, 51; 710/62, 110; 455/419
See application file for complete search history.

(56) References Cited

U.S. PATENT DOCUMENTS

| | | | | |
|---|---|---|---|---|
| 6,240,478 B1 * | 5/2001 | Brickell | ....................... | 710/110 |
| 6,633,759 B1 * | 10/2003 | Kobayashi | ................... | 455/419 |
| 6,931,463 B2 * | 8/2005 | Striemer | ....................... | 710/62 |
| 6,942,157 B2 * | 9/2005 | Nozawa et al. | ............... | 235/492 |
| 7,373,431 B2 | 5/2008 | Kondo | | |

FOREIGN PATENT DOCUMENTS

| | | |
|---|---|---|
| JP | 59-217214 | 12/1984 |
| JP | 4-322592 | 11/1992 |
| JP | 2003-179821 | 6/2003 |
| JP | 2007-266969 | 10/2007 |

* cited by examiner

*Primary Examiner*—Jean B Jeanglaude
(74) *Attorney, Agent, or Firm*—Oblon, Spivak, McClelland, Maier & Neustadt, L.L.P.

(57) ABSTRACT

A transmission device configured to transmit a transmission bit string which is an arrangement of a unit bit string of multiple N bits includes: a conversion unit configured to convert the unit bit string into a converted bit string in accordance with a conversion table obtained by obtaining an error rate wherein a k'th bit out of the N bits is in error; obtaining an error expectancy which is an expectancy that a significant bit of the N bits in the unit bit string will err; and creating a conversion table that correlates the unit bit string and a converted bit string obtained by converting the insignificant bit of the unit bit string to a smallest error expectancy bit pattern which is a bit pattern that minimizes the error expectancy of the multiple bit patterns; and a transmission unit configured to transmit the converted bit string.

12 Claims, 15 Drawing Sheets

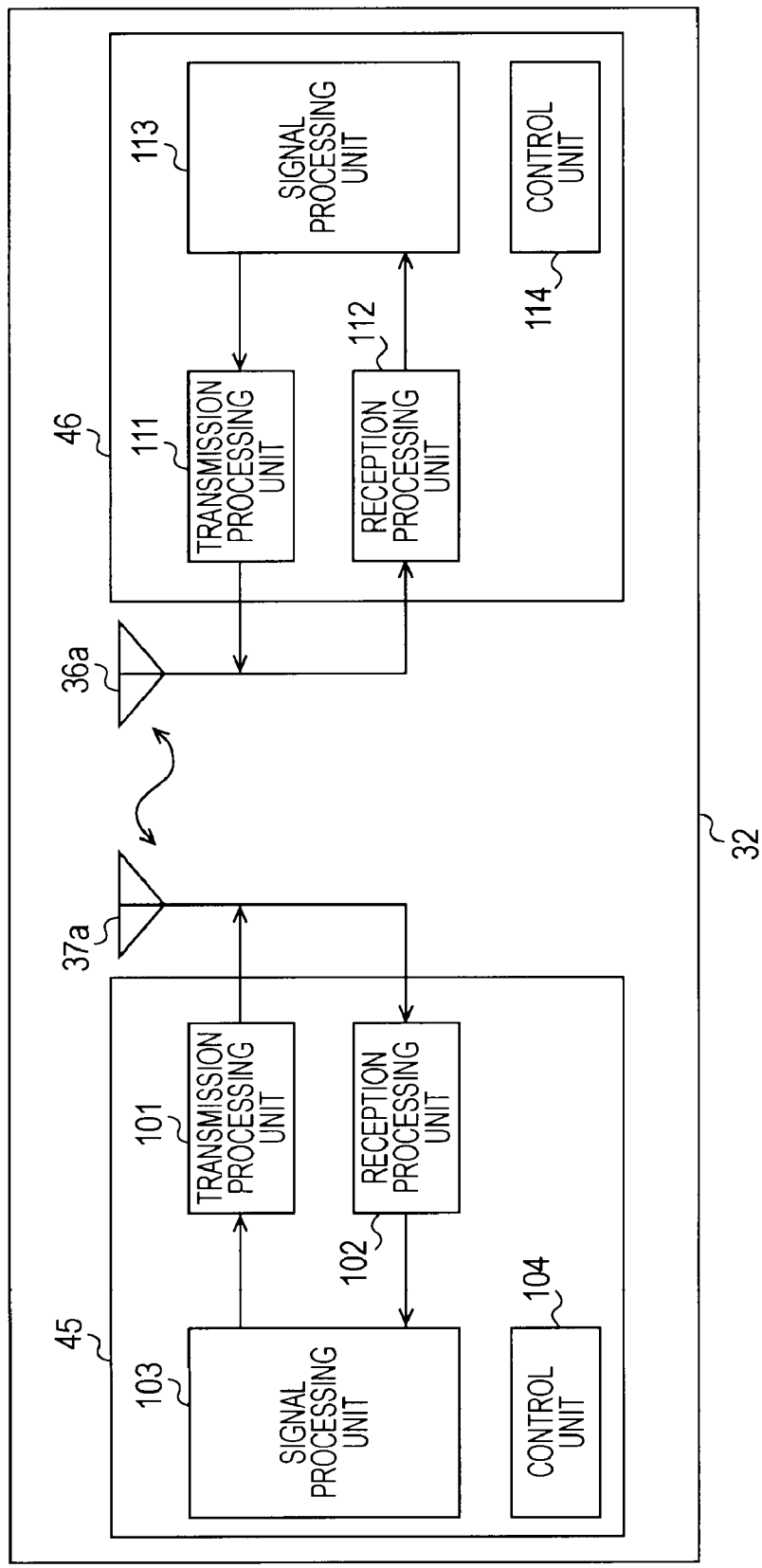

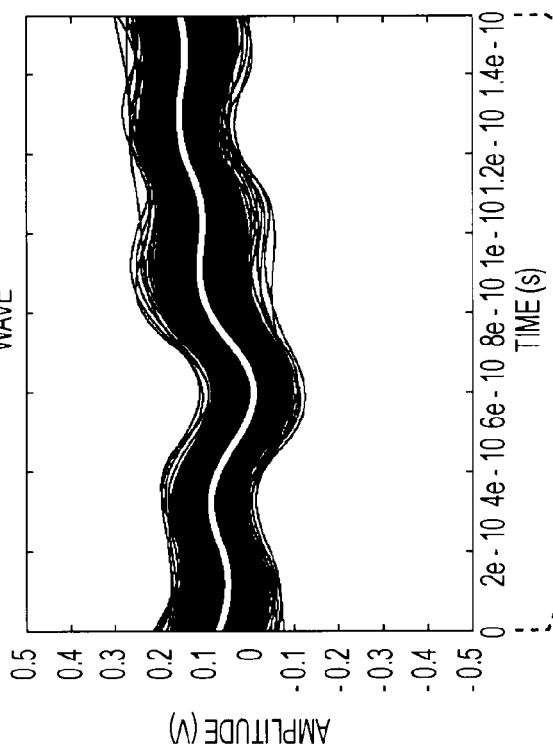
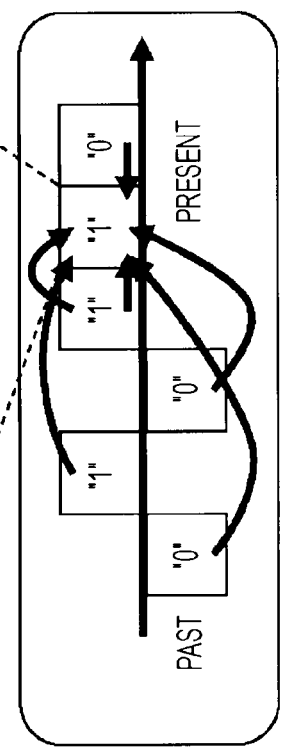
FIG. 5B
IN-CASING WAVE
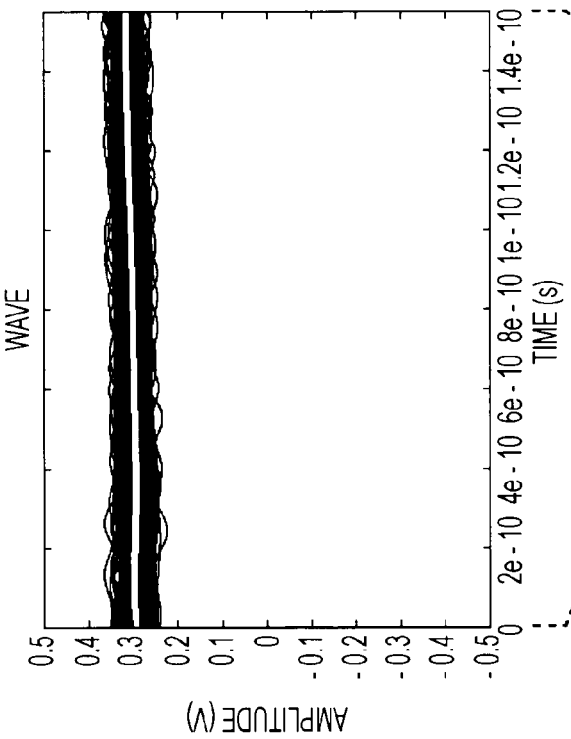
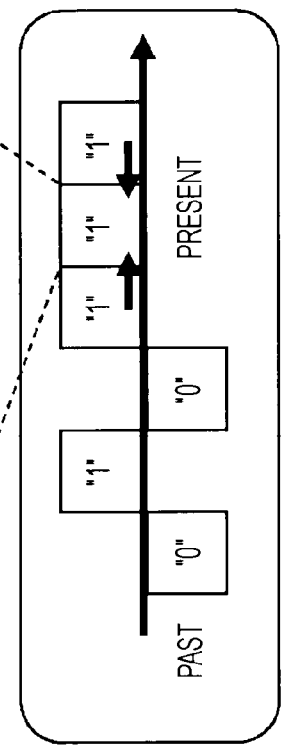
FIG. 5A
CABLE WAVE

FIG. 12

CONVERSION TABLE

| BIT PATTERN | BIT PATTERN WITH LOWEST ERROR EXPECTANCY | BIT PATTERN | BIT PATTERN WITH LOWEST ERROR EXPECTANCY |
|---|---|---|---|
| 000XX000 | 11 | 100XX000 | 11 |
| 000XX001 | 11 | 100XX001 | 10 |
| 000XX010 | 01 | 100XX010 | 01 |
| 000XX011 | 00 | 100XX011 | 00 |
| 000XX100 | 11 | 100XX100 | 11 |
| 000XX101 | 11 | 100XX101 | 11 |
| 000XX110 | 01 | 100XX110 | 01 |
| 000XX111 | 10 | 100XX111 | 10 |
| 001XX000 | 11 | 101XX000 | 11 |
| 001XX001 | 10 | 101XX001 | 10 |
| 001XX010 | 01 | 101XX010 | 01 |
| 001XX011 | 10 | 101XX011 | 10 |
| 001XX100 | 11 | 101XX100 | 11 |
| 001XX101 | 11 | 101XX101 | 11 |
| 001XX110 | 01 | 101XX110 | 01 |
| 001XX111 | 10 | 101XX111 | 10 |
| 010XX000 | 11 | 110XX000 | 01 |
| 010XX001 | 11 | 110XX001 | 11 |
| 010XX010 | 00 | 110XX010 | 01 |
| 010XX011 | 00 | 110XX011 | 00 |
| 010XX100 | 11 | 110XX100 | 11 |
| 010XX101 | 11 | 110XX101 | 11 |
| 010XX110 | 01 | 110XX110 | 01 |
| 010XX111 | 00 | 110XX111 | 10 |
| 011XX000 | 11 | 111XX000 | 01 |
| 011XX001 | 10 | 111XX001 | 11 |
| 011XX010 | 00 | 111XX010 | 01 |
| 011XX011 | 00 | 111XX011 | 10 |
| 011XX100 | 11 | 111XX100 | 11 |
| 011XX101 | 11 | 111XX101 | 11 |
| 011XX110 | 01 | 111XX110 | 01 |
| 011XX111 | 10 | 111XX111 | 11 |

TRANSMISSION DEVICE AND TRANSMISSION METHOD, INFORMATION PROCESSING DEVICE AND INFORMATION PROCESSING METHOD, AND PROGRAM

CROSS REFERENCES TO RELATED APPLICATIONS

The present invention contains subject matter related to Japanese Patent Application JP 2008-000972 filed in the Japanese Patent Office on Jan. 8, 2008, the entire contents of which are incorporated herein by reference.

BACKGROUND OF THE INVENTION

1. Field of the Invention

The present invention relates to a transmission device, transmission method, information processing device, information processing method, and program, and in particular relates to a transmission device, transmission method, information processing device, information processing method, and program such that, for example, data errors occurrences arising from multipath can be readily prevented.

2. Description of the Related Art

Heretofore, there have been signal processing devices which subject image signals from external devices such as a DVD (Digital Versatile Disc) player or the like to signal processing and supply image signals to a display device such as a CRT (Cathode Ray Tube) or LCD (Liquid Crystal Display).

With such a signal processing device, signal processing is performed, such as noise removal processing to remove noise from the signal of the image supplied from the external device, image conversion processing to convert the image signal so that the image displayed on the display device is of a higher image quality than the image from the external device, image adjusting processing to adjust the brightness or contrast of the image displayed on the display device, and so forth.

FIG. 1 is a block diagram showing a configuration of an example of a current signal processing device. In FIG. 1, a signal processing device 11 is made up of a casing 12, connectors $13_1$ through $13_4$, input selector 14, signal router 15, connectors $16_1$ through $16_4$, connectors $17_1$ through $17_3$, functional blocks $18_1$ through $18_3$, connector 19, remote commander 20, operating unit 21, system control block 22, and control bus 23 and so forth.

With the signal processing device 11, the connectors $13_1$ through $13_4$ are connected to the input selector 14 via signal cables, and the input selector 14 is connected to the signal router 15 via the signal cable. Also, the signal router 15 is connected to the connectors $16_1$ through $16_4$ and the connector 19 via the signal cables, and is further connected to the functional blocks $18_1$ through $18_3$, via the connectors $16_1$ through $16_4$ and connectors $17_1$ through $17_3$. Also, the input selector 14, signal router 15, connectors $16_1$ through $16_4$, and system control block 22 are mutually connected via the control bus 23.

The casing 12 is a metallic casing in a cuboid shape, for example, and the input selector 14, signal router 15, connectors $16_1$ through $16_4$, connectors $17_1$ through $17_3$, functional blocks $18_1$ through $18_3$, system control block 22, and control bus 23 are stored therein.

Also, the connectors $13_1$ through $13_4$, and 19, and the operating unit 21 are provided to the casing 12 so as to protrude externally from the casing.

Cables which connect the signal processing device 11 and external devices (unshown) such as a tuner or DVD player which supplies an image signal to the image processing device 11 are connected to the connectors $13_1$ through $13_4$.

An image signal from an external device is supplied to the input selector 14 via the connectors $13_1$ through $13_4$. The input selector 14 selects an image signal supplied from the connectors $13_1$ through $13_4$, according to control by the system control block 22, and supplies this to the signal router 15.

The signal router 15 supplies the signal supplied from the input selector 14 to the function block $18_i$, via the connectors $16_i$ and $17_i$, according to control by the system control block 22 (in FIG. 1, i=1, 2, 3).

Also, the signal subjected to signal processing is supplied to the signal router 15 from the functional block $18_i$, via the connectors $17_i$ and $16_i$. The signal router 15 supplies the signal from the functional block $18_i$ to a display device (unshown) connected to the connector 19, via the connector 19.

The connectors $16_i$ and $17_i$ are mutually detachable, and connect each of the signal router 15 and control bus 23, and the functional block $18_i$. Note that in FIG. 1, four connectors $16_1$ through $16_4$ are provided within the casing 12, and of these, the three connectors $16_1$ through $16_3$ are connected to each of the connectors $17_1$ through $17_3$ of the functional blocks $18_1$ through $18_3$. In FIG. 1, the connector $16_4$ which is not connected to anything can be connected to (a connector of) a new functional block added to the signal processing device 11.

The functional blocks $18_1$ through $18_3$ each have a signal processing circuit to perform signal processing such as noise removing processing, image converting processing, image adjusting processing, or the like. The functional blocks $18_1$ through $18_3$ perform signal processing as to the signal supplied from the signal router 15, and supplies the signal subjected to signal processing to the signal router 15.

The connector 19 is connected to a cable which connects the signal processing device 11 and a display device that displays the image output from the signal processing device 11.

The remote commander 20 has multiple buttons or the like that are operated by a user, and supplies (transmits) an operation signal operated by a user according to user operation to the system control block 22, using infrared rays or the like.

In the same way as with the remote commander 20, the operating unit 21 has multiple buttons or the like that are operated by a user, and supplies (transmits) an operation signal operated by a user according to user operation to the system control block 22.

Upon the operation signal according to user operation being supplied from the remote commander 20 or operating unit 21, the system control block 22 controls the input selector 14, signal router 15, or functional blocks $18_1$ through $18_3$, via the control bus 23, such that processing according to the operating signal thereof is performed.

With the signal processing device 11 thus configured, the image signal is supplied to the signal router 15 via the connectors $13_1$ through $13_4$ and the input selector 14, and the image signal is transferred (transmitted) between the signal router 15 and the functional blocks $18_1$ through $18_3$, via signal cables.

In recent years, the capacity of image signals subjected to signal processing by the signal processing device 11 has tended to be larger in accordance with increases in high definition of images. As the capacity of the image signal increases, for example the image signal is transferred at high speed between the signal router 15 and the functional blocks $18_1$ through $18_3$, via signal cables. Thus, when a signal is transferred at high speed, problems occur in the signal transfer from influences such as frequency features of the signal cable, crosstalk, shifting (skewing) of timing that occurs with parallel signal cables, and so forth.

There is a method to perform signal transmission with wireless communication. The wireless communication here may include proximity non-contact communication used with IC (Integrated Circuit) tags and so forth which uses electromagnetic induction to transfer a signal, for example, or wireless communication which uses radio waves.

In order to perform proximity non-contact communication, the transmission side and receiving side should be disposed in a state of a certain proximity to one another, and accordingly, when proximity non-contact communication is performed between boards on the signal processing device, constraints are received regarding placement of the boards and so forth.

On the other hand, with wireless communication using radio waves, there are no such constraints. For example, Japanese Unexamined Patent Application Publication No. 2003-179821 discloses a signal processing device which performs signal processing by boards housed within the same casing transfers a signal by wireless communication using radio waves.

As described in Japanese Unexamined Patent Application Publication No. 2003-179821, for example by the signal router 15 and the functional blocks $18_1$ through $18_3$ transferring a signal by wireless communication using radio waves, problems which occur by transferring a signal at high speed via a signal cable can be avoided.

However, upon the signal router 15 and the functional blocks $18_1$ through $18_3$ transferring a signal by wireless communication using radio waves within the casing 12 of the signal processing device 11, multiple transfer paths (multipath) with differing transfer path distances occur as a result of the radio waves reflecting off the wall face of the casing 12 or by diffraction of radio waves due to the boards built into the casing 12. Upon multipath occurring, multiple signals having shifted phases arrive at the receiving side that receives the signal, the multiple signals thereof interfere with one another such that multipath fading occurs, and an error occurs in the bit (bit string) reproduced on the receiving side.

That is to say, upon multipath occurring, for example the signal of the bit transmitted later is affected by the signal of the bit transmitted earlier (in the past), and consequently, multipath fading occurs wherein the waveform of the signal of the bit transmitted later is deformed, and an error can occur in the bit reproduced on the receiving side.

Also, the phases of the signals can shift, thereby interference occurring, whereby interference occurs, with multipath occurring with other than wireless communication in a casing, e.g. with mobile communication by a portable telephone whereby the radio waves reflect against structures such as buildings. Further, other than such wireless communication also, for example, in transmitting a signal via a cable, the signal may reflect against the end portions of the cable, whereby interference occurs between the signal to be transferred and the reflected signal.

With general wireless communication, methods to counter multipath from signal processing, for example includes a method that employs OFDM (Orthogonal Frequency Division Multiplexing) for a modulation method, a method that performs RAKE receiving at the receiving side along with employing a specter diffusing method for a modulation method, a method that employs MIMO (Multiple Input Multiple Output) using a multi-antenna (multiple antennae) at the transmitting side and receiving side, and a method using a waveform equalizer and so forth.

However, with the method employing OFDM for the modulation method, the processing load for FFT (Fast Fourier Transform) for modulation and demodulation, or for A/D (Analog/Digital) conversion is heavy, in the case of performing processing at a high speed, heat has to be dealt with.

With the method employing a specter diffusing method for the modulation method and performing RAKE receiving, processing has to be performed at a chip rate several times faster than the baseband speed at the time of modulating or demodulating, whereby realizing high speed communication is difficult.

With a method employing MIMO or a method employing a waveform equalizer, problems may occur such as noise that is uncorrelated with the transferring information can be superimposed on the transferring information, space to dispose the antennae within the casing is limited so disposing of a multi-antenna so as to be mutually uncorrelated is difficult, high speed A/D conversion is performed, inserting a UW (Unique Word) in a packet is performed, and a large-scale predicting circuit is used in order to improve accuracy of predicting changes to transfer features, and so forth.

Also, in order to deal with multipath, there are methods to perform error correcting of bits occurring in the communication path on the receiving side; for example, a method that uses a combination of convolutional coding and Viterbi decoding, or uses error correcting encoding such as RD (Reed-Solomon) encoding and turbo encoding.

However, performing error correcting on the receiving side demands a band communication bandwidth wider by the data amount increased by error correcting encoding, or compressing the data at a higher compression rate.

Also, both the transmission side and reception side end up using larger circuits, in order to generate error correcting encoding on the transmission side, and in order to perform error correcting on the receiving side.

SUMMARY OF THE INVENTION

Heretofore, readily preventing the occurrence of data errors resulting from multipath has been difficult. There has been recognized demand to readily prevent the occurrence of data error resulting from multipath.

A transmission device or program according to an embodiment of the present invention is a transmission device, or a program to cause a computer to function as a transmission device, configured to transmit a transmission bit string which is an arrangement of a unit bit string of multiple N bits, including: a conversion unit configured to convert the unit bit string into a converted bit string in accordance with a conversion table obtained by obtaining an error rate wherein a k'th bit out of the N bits is in error for a test pattern which is a bit pattern of N bits that can assume the unit bit string; obtaining an error expectancy which is an expectancy that a significant bit of the N bits in the unit bit string will err, for each of the multiple bit patterns that an insignificant bit, which is a bit that is not significant, can assume of the N bits of the unit bit string, using the error rate of the test pattern wherein the significant bit of the N bits in the unit bit string is the k'th bit; and creating a conversion table that correlates the unit bit string and a converted bit string obtained by converting the insignificant bit of the unit bit string to a smallest error expectancy bit pattern which is a bit pattern that minimizes the error expectancy of the multiple bit patterns; and a transmission unit configured to transmit the converted bit string.

A transmission method according to an embodiment of the present invention is a transmission method for a transmission device configured to transmit a transmission bit string which is an arrangement of a unit bit string of multiple N bits, including the steps of: converting the unit bit string into a converted bit string in accordance with a conversion table obtained by obtaining an error rate wherein a k'th bit out of the N bits is in error for a test pattern which is a bit pattern of N bits that can assume the unit bit string; obtaining an error expectancy which is an expectancy that a significant bit of the N bits in the unit bit string will err, for each of the multiple bit patterns that an insignificant bit, which is a bit that is not significant, can assume of the N bits of the unit bit string, using the error rate of the test pattern wherein the significant bit of the N bits in the unit bit string is the k'th bit; and creating a conversion table that correlates the unit bit string and a converted bit string obtained by converting the insignificant bit of the unit bit string to a smallest error expectancy bit pattern which is a bit pattern that minimizes the error expectancy of the multiple bit patterns; and transmitting the converted bit string.

With such a configuration, the unit bit string is converted into the converted bit string according to the conversion table, and the converted bit string is transmitted. The conversion table is compiled by obtaining the error rate that the k'th bit of the N bits errs for a test pattern which is a bit pattern of the N bits that can assume the unit bit string, obtaining an error expectancy which is an expectancy that a significant bit of the N bits in the unit bit string will err, for each of the multiple bit patterns that an insignificant bit, which is a bit that is not significant, can assume of the N bits of the unit bit string, using the error rate of the test pattern wherein the significant bit of the N bits in the unit bit string is the k'th bit; and correlating the unit bit string and a converted bit string obtained by converting the insignificant bit of the unit bit string to a smallest error expectancy bit pattern which is a bit pattern that minimizes the error expectancy of the multiple bit patterns.

An information processing device or program according to an embodiment of the present invention is an information processing device, or a program to cause a computer to function as an information processing device, configured to compile a conversion table used to convert a unit bit string of multiple N bits into a predetermined converted bit string, including: an error rate computing unit configured to obtain an error rate where a k'th bit of the N bits of the test pattern errs, by comparing a test pattern generated by a test pattern generating unit that generates a test pattern which is a bit pattern of the N bits that can assume the unit bit string and a received test pattern obtained by receiving the test pattern transmitted by the transmission device that transmits test patterns; an error expectancy computing unit configured to obtain an error expectancy which is an expectancy that a significant bit of the N bits in the unit bit string errs, for each of multiple bit patterns that an insignificant bit can assume, which is bit that is not significant, of the N bits in the unit bit string, using the error rate of the test pattern wherein the significant bit of the N bits in the unit bit string is the k'th bit; and a conversion table compiling unit configured to compile a conversion table correlating the unit bit string with a converted bit string obtained by converting the insignificant bit of the unit bit string to a smallest error expectancy bit pattern which is a bit pattern that minimizes the error expectancy of the multiple bit patterns.

An information processing method according to an embodiment of the present invention is an information processing method for an information processing device configured to compile a conversion table used to convert a unit bit string of multiple N bits into a predetermined converted bit string, the information processing method including the steps of: obtaining an error rate where a k'th bit of the N bits of the test pattern errs, by comparing a test pattern generated by a test pattern generating unit that generates a test pattern which is a bit pattern of the N bits that can assume the unit bit string and a received test pattern obtained by receiving the test pattern transmitted by the transmission device that transmits test patterns; obtaining an error expectancy which is an expectancy that a significant bit of the N bits in the unit bit string errs, for each of multiple bit patterns that an insignificant bit can assume, which is bit that is not significant, of the N bits in the unit bit string, using the error rate of the test pattern wherein the significant bit of the N bits in the unit bit string is the k'th bit; and compiling a conversion table correlating the unit bit string with a converted bit string obtained by converting the insignificant bit of the unit bit string to a smallest error expectancy bit pattern which is a bit pattern that minimizes the error expectancy of the multiple bit patterns.

With such a configuration, an error rate is obtained where a k'th bit of the N bits of the test pattern errs, by comparing a test pattern generated by a test pattern generating unit that generates a test pattern which is a bit pattern of the N bits that can assume the unit bit string and a received test pattern obtained by receiving the test pattern transmitted by the transmission device that transmits test patterns. Further, an error expectancy which is an expectancy that a significant bit of the N bits in the unit bit string errs, for each of multiple bit patterns that an insignificant bit can assume, which is bit that is not significant, of the N bits in the unit bit string, using the error rate of the test pattern wherein the significant bit of the N bits in the unit bit string is the k'th bit. Also, a conversion table is compiled correlating the unit bit string with a converted bit string obtained by converting the insignificant bit of the unit bit string to a smallest error expectancy bit pattern which is a bit pattern that minimizes the error expectancy of the multiple bit patterns.

Note that the program may be provided by transmitting via a transmission medium or recorded in a recording medium.

Also, an arrangement may be made such that the transmission device and information processing device is an independent device, or may be one internal block which makes up one device.

According to the above configurations, data error due to multipath can be readily prevented.

BRIEF DESCRIPTION OF THE DRAWINGS

FIG. 4 is a block diagram illustrating a configuration example of a communication system made up of a signal router and functional block within a casing;

FIGS. 5A and 5B are diagrams describing signal distortion occurring due to multipath;

FIG. 12 is a diagram illustrating an example of a conversion table;

DESCRIPTION OF THE PREFERRED EMBODIMENTS

Figure 2:
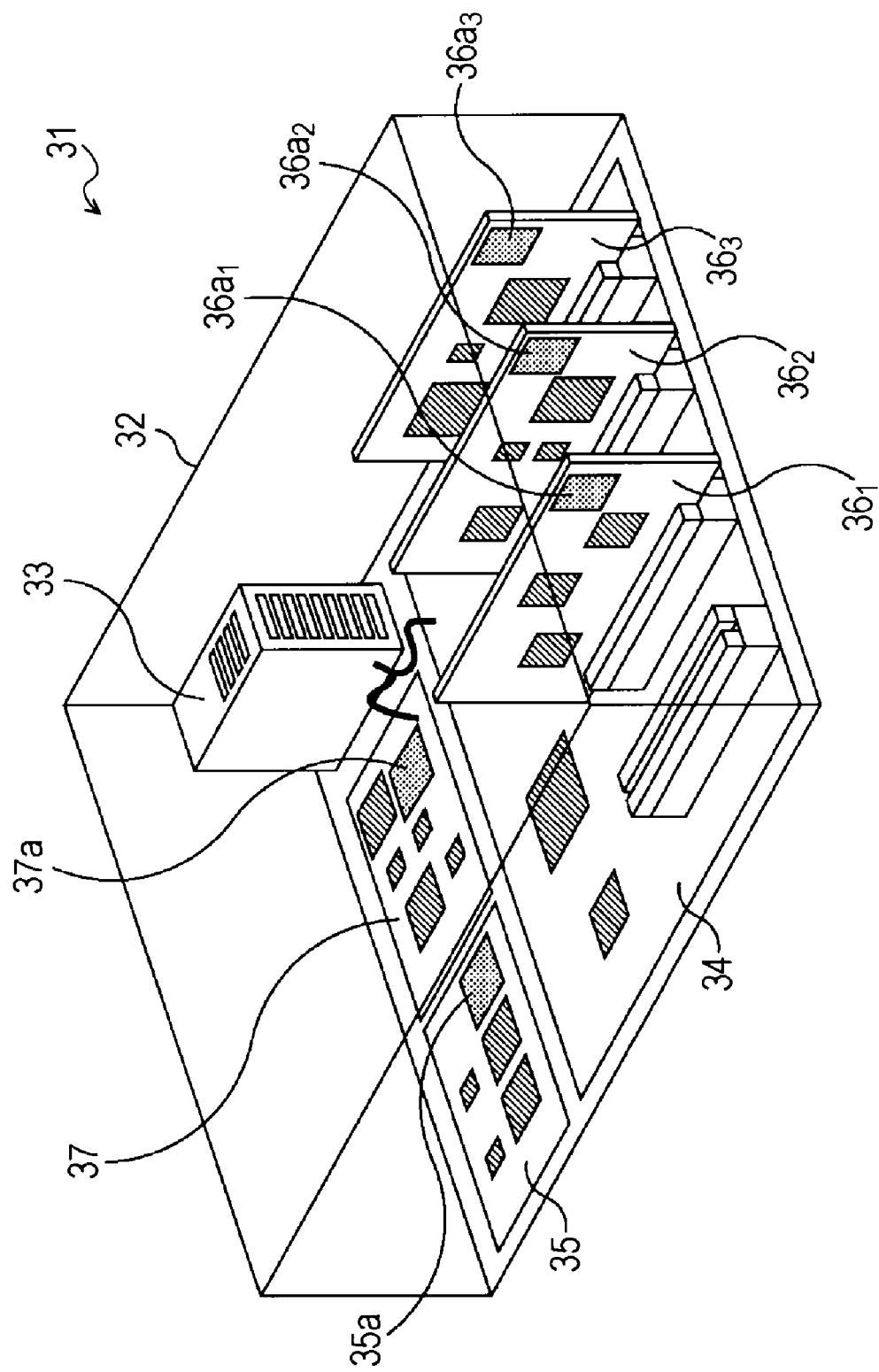
FIG. 2 is a perspective view illustrating a configuration example according to an embodiment of a signal processing device to which the present invention is applied.

FIG. 2 is a perspective view showing a configuration example of an embodiment of a signal processing apparatus to which the present invention is applied. In FIG. 2, the signal processing device 31 is made up of a casing 32, power module 33, board (platform board) 34, board (input board) 35, boards (signal processing boards) $36_1$ through $36_3$, and board (output board) 37.

The casing 32 is a metallic casing in a cuboid shape, and the power module 33, platform board 34, input board 35, signal processing boards $36_1$ through $36_3$, and output board 37 are stored therein.

The power module 33 supplies power for driving to the platform board 34, input board 35, signal processing boards $36_1$ through $36_3$, and output board 37.

Signal processing boards $36_1$ through $36_3$ are mounted onto the platform board 34. Note that power is supplies to the signal processing boards $36_1$ through $36_3$ from the power module 33, via the platform board 34.

The input board 35 is connected to the connectors $13_1$ through $13_4$ (FIG. 3) provided external to the casing 32, and an image signal for example is supplied to the input board 35 from an external device (unshown) connected via the connectors $13_i$. Also, the input board 35 has an antenna 35a for performing wireless communication using radio waves, and transmits (transfers) the image signal supplied from the external device to the signal processing boards $36_1$ through $36_3$ via the antenna 35a.

The signal processing boards $36_1$ through $36_3$ have respective antennas $36a_1$ through $36a_3$ for performing wireless communication using radio waves. The image signal transmitted from the input board 35 is supplied to the signal processing boards $36_i$ via the antenna $36a_i$. The signal processing board $36i$ performs signal processing as to the image signal from the input board 35 such as noise removal processing, image conversion processing, image adjusting processing, or the like, and transmits the image signal subjected to the signal processing to the output board 37 via the antenna $36a_i$.

The output board 37 has an antenna 37a to perform wireless communication using radio waves, and is also connected to a connector 19 (FIG. 3) provided on the casing 32. The output board 37 receives the image signal transmitted from the signal processing boards $36_1$ through $36_3$ via the antenna 37a and supplies this to a display device (unshown) that is connected to the connector 19.

Figure 1:
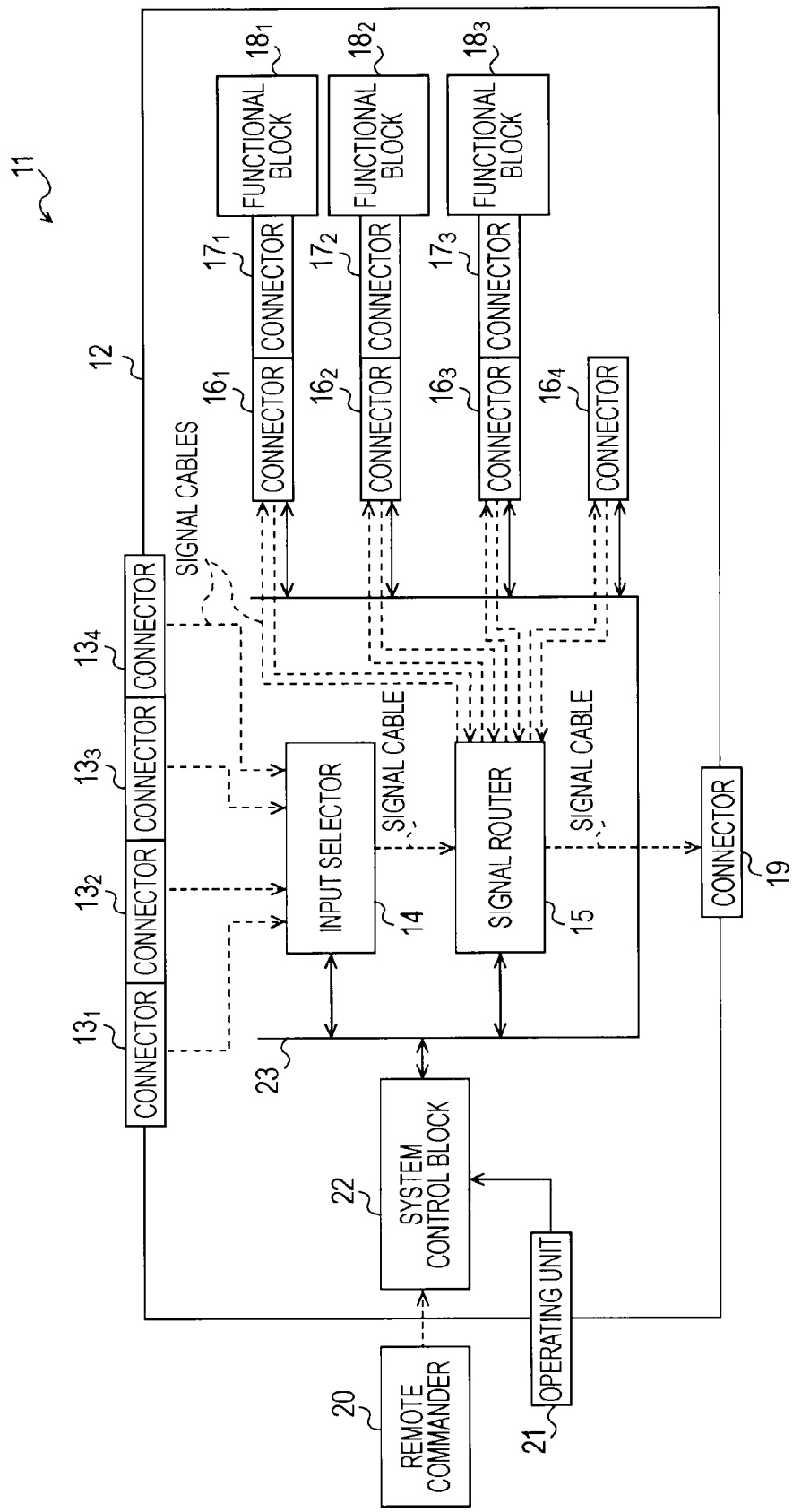
FIG. 1 is a block diagram illustrating a configuration of an example of a signal processing device according to the related art.
Figure 3:
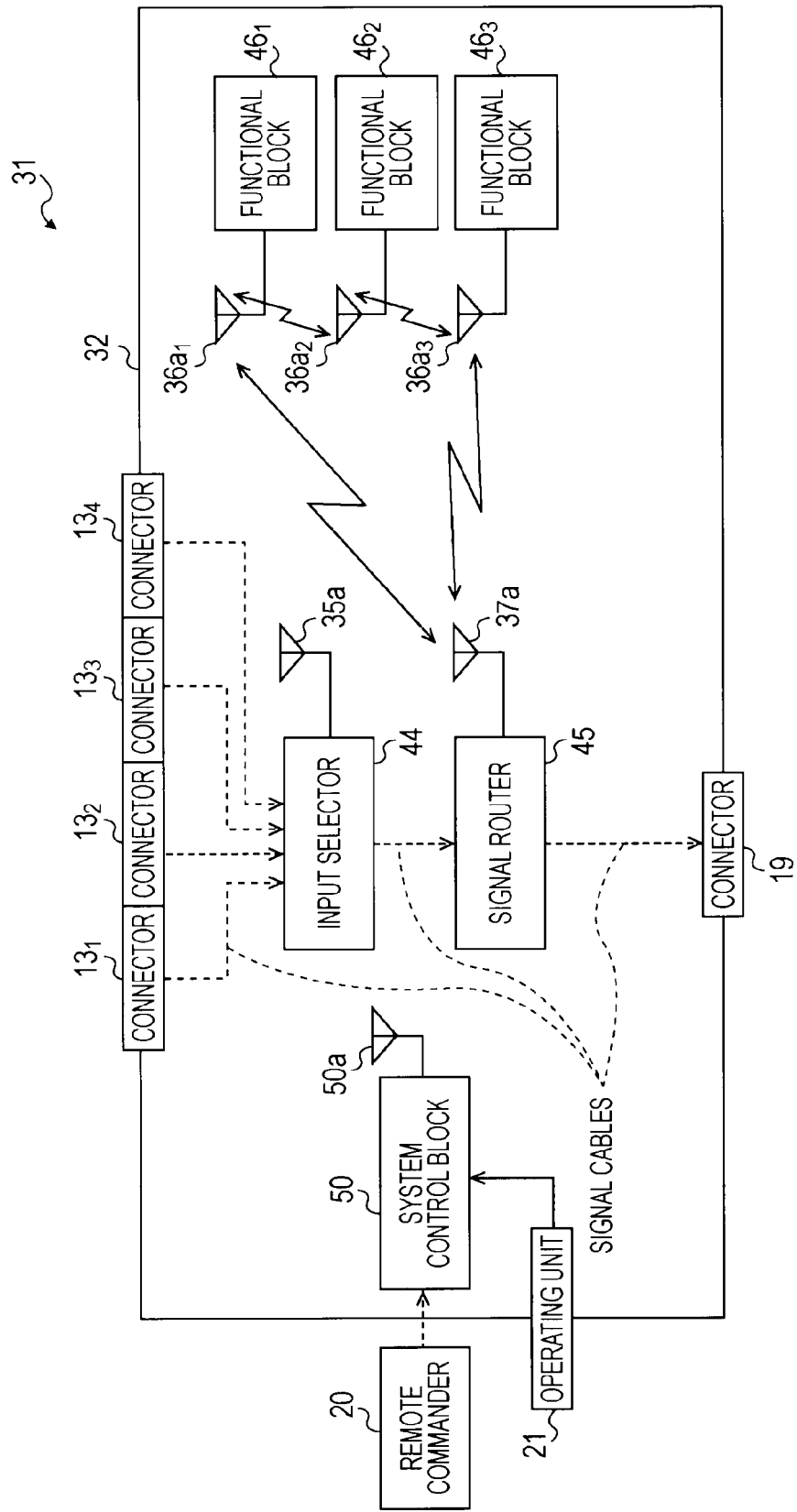
FIG. 3 is a block diagram illustrating an electrical configuration example according to an embodiment of a signal processing device to which the present invention is applied.

Next, FIG. 3 is a block diagram showing an electrical configuration example of the signal processing device 31 in FIG. 2. The portions in FIG. 3 corresponding to the signal processing device 11 in FIG. 1 have the same reference numerals, so the description thereof will be omitted as appropriate. In FIG. 3, the signal processing device 31 is made up of connectors $13_1$ through $13_4$, a connector 19, remote commander 20, operating unit 21, casing 32, input selector 44, signal router 45, functional block $46_1$ through $46_3$, and system control block 50.

With the signal processing device 31, the connectors $13_1$ through $13_4$ are connected to the input selector 44 via signal cables, and the input selector 44 is connected to the signal router 45 via a signal cable, and the signal router 45 is connected to the connector 19 a the signal cable under control of the system control block 50.

The input selector 44, signal router 45, functional block $46_1$ through $46_3$, and system control block 50 are stored within the casing 32.

The input selector 44 is provided to the input board 35 in FIG. 2, for example, and can perform wireless communication via the antenna 35a provided to the input board 35.

Also, an image signal from an unshown external device is supplied to the input selector 44 via the connectors $13_1$ through $13_4$. The input selector 44 selects the image signal supplied from the external device connected to the connectors $13_1$ through $13_4$ and supplies this to the signal router 45.

The signal router 45 is provided to the output board 37 in FIG. 2, for example, whereby wireless communication is enabled via the antenna 37a provided on the output board 37.

The signal router 45 transmits the image signal supplied from the input selector 44 by wireless communication using radio waves via the antenna 37a to the functional blocks $46_1$ through $46_3$, in accordance with control by the system control block 50. Also, the signal router 45 receives the image signal transmitted from the functional blocks $46_1$ through $46_3$ by wireless communication using radio waves via the antenna 37a, and supplies the image signal transmitted from the functional blocks $46_1$ through $46_3$ to the display device (unshown) which is connected to the connector 19, via the connector 19.

The functional blocks $46_1$ through $46_3$ are provided to the signal processing boards $36_1$ through $36_3$ in FIG. 2, respectively, for example, whereby performing wireless communication via the antennas $36a_1$ through $36a_3$ provided on the signal processing boards $36_1$ through $36_3$ is enabled.

The functional block $46_i$ receives an image signal transmitted from the signal router 45 by wireless communication using radio waves, via the antenna $36a_i$, and subjects the image signal thereof to signal processing such as noise removing processing, image converting processing, image adjusting processing, or the like. The functional block $46_i$ transmits the image signal subjected to the signal processing to the signal router 45 by wireless communication using radio waves, via the antenna $36a_i$. Also, the functional blocks $46_i$ and $46_j$ perform transmission/reception of signals by wireless communication with one another as appropriate, via the antennas $36a_i$ and $36a_j$.

Note that in the case that each of the functional blocks $46_1$ through $46_3$ do not have to be individually distinguished, the functional blocks $46_1$ through $46_3$ are called a functional block 46, as appropriate. Similarly, the antennas $36a_1$ through $36a_3$ are called an antenna 36a.

The system control block 50 is provided on the platform board 34 in FIG. 2, for example, whereby wireless communication is enabled via an antenna 50a not shown in FIG. 2, which is provided to the platform board 34. Also, an operating signal is supplied from the remote commander 20 and operating unit 21 to the system control block 50.

Upon the operating signal according to user operation being supplied from the remote commander 20 or operating unit 21, the system control block 50 controls the input selector 44, signal router 45, and functional block 46 by wireless communication using radio waves, via the antenna 50a such that processing according to the operating signal thereof is performed.

Within the casing 32 of the signal processing device 31 configured as described above, one arbitrary block of the input selector 44, signal router 45, functional block 46, and system control block 50 becomes the transmitting device, while one or more other blocks becomes the reception device, whereby the transmitting device transmits the image signal, control signal, and other signal, for example, by wireless communication using radio waves. The reception device then receives the signal from the transmitting device.

In order to simplify the description herein, let us focus on the signal router 45 and functional block 46, and describe the wireless communication which the signal router 45 and functional block 46 thereof performs within the casing 32.

FIG. 4 is a block diagram showing a configuration example of a communication system (system refers to a theoretical collection of multiple devices, and does not matter whether each configuration device is housed within the same casing) made up of the signal router 45 and functional block 46 within the casing 32.

The signal router 45 is made up of a transmission processing unit 101, reception processing unit 102, signal processing unit 103, and control unit 104.

The transmission processing unit 101 performs transmitting processing to transmit data supplied from the signal processing unit 103 (i.e. image signal) or a control signal such as a command or the like supplied from the control unit 104, by radio waves from an antenna 37a.

Upon the antenna 37a receiving the radio waves, the reception processing unit 102 performs reception processing to receive the signal supplied from the antenna 37a, and supplies the data obtained as a result thereof (including a control signal) to the signal processing unit 103 or control unit 104, as appropriate.

The signal processing unit 103 subjects the data supplied from the reception processing unit 102 to predetermined signal processing as the signal router 45, and supplies the data obtained as a result to the transmission processing unit 101.

The control unit 104 controls the transmission processing unit 101, reception processing unit 102, and signal processing unit 103, for example, in accordance with the control signal or the like supplied from the reception processing unit 102.

Note that in FIG. 4, the connection lines that connect each of the transmission processing unit 101, reception processing unit 102, and signal processing unit 103 with the control unit 104 are omitted in the diagram so as to avoid a cumbersome diagram. The connection lines that connect each of a transmission processing unit 111, reception processing unit 112, and signal processing unit 113 of the functional block 46 with the control unit 114 are also similar.

The functional block 46 is made up of the transmission processing unit 111, reception processing unit 112, signal processing unit 113, and control unit 114. Note that the transmission processing unit 111, reception processing unit 112, signal processing unit 113, and control unit 114 are made up similar to the transmission processing unit 101, reception processing unit 102, signal processing unit 103, and control unit 104 of the signal router 45, respectively, so the descriptions thereof will be omitted.

With a communication system thus configured, for example in the case of transmitting data from the signal router 45 to the functional block 46, with the signal router 45 the transmission processing unit 101 transmits the data supplied from the signal processing unit 103 and so forth by radio waves from the antenna 37a. The radio waves transmitted from the antenna 37a are received by the antenna 36a, and the signal corresponding to the radio waves thereof are supplied to the reception processing unit 112 of the functional block 46.

The reception processing unit 112 receives a signal from the antenna 36a, and supplies the data obtained as a result thereof to the signal processing unit 113. With the signal processing unit 113, the data supplied from the reception processing unit 102 is subjected to predetermined signal processing as the functional block 46. Similarly, data can be transmitted to the signal router 45 from the functional block 46 also.

Note that hereafter, description will be made with the assumption that the signal router 45 is the transmission device to transmit data, and the functional block 46 is the reception device to receive the data.

In the case that the signal router 45 and functional block 46 performs wireless communication within the casing 32, the radio waves reflect within the casing 32, whereby multipath can occur.

Upon multipath occurring, with the signal router 45 serving as the transmission device, the bit signal transmitted later is affected (interference occurs) by the bit signal transmitted earlier (in the past), whereby the waveform of the bit signal transmitted later is distorted (fading occurs), and an error can occur in the bit received with the functional block 46 serving as the reception device.

The distortion occurring in the waveform of a certain bit signal differs by the peripheral bits of such bit (the bits transmitted before and after the bit).

Therefore, for example, if we say that a bit string of N bits which is multiple bits is a unit bit string, upon the unit bit string being transmitted from the signal router 45 serving as the transmission device to the functional block 46 serving as the reception device, the error rate feature wherein a particular one bit in the unit bit string has an error differs from the average error rate feature in a communication path between the signal router 45 serving as the transmission device and the functional block 46 serving as the reception device.

However, the power module 33, platform board 34, input board 35, signal processing boards $36_1$ through $36_3$, and output board 37, are each fixed within the casing 32 of the signal processing device 31 (FIG. 2). Thus, radio waves constantly reflect similarly off the wall faces and various boards of the casing 32, so the interference of the radio waves reflecting off the wall faces of the casing 32, the boards 35, $36_1$ through $36_3$, and 37 becomes continual, and consequently the manner of distortion of the waveforms of one particular bit signal of the unit bit string also becomes continual.

That is to say, for example, with mobile wireless communication represented by portable telephones and the like, the manner of interference resulting from multipath changes as the wireless station moves, whereby processing to remove interference has to be performed in real-time in accordance with such changes.

On the other hand, with the wireless communication performed within the casing 32 (hereafter also called in-casing wireless communication), the signal router 45 serving as the transmission device and the functional block 46 serving as the reception device do not move. Further, with the in-casing wireless communication, the power module 33, platform board 34, input board 35, signal processing boards $36_1$ through $36_3$, and output board 37 are fixed in the casing 32, whereby as long as there is no addition, deletion (removal), or update to the boards and so forth, the communication environment does not change.

Accordingly, with the in-casing wireless communication, the manner of interference does not change according to time, but becomes continual, and even the manner of distortion of the signal waveform resulting from the interference thereof becomes continual.

Thus, with the in-casing wireless communication, the manner of distortion of the signal waveform resulting from multipath becomes continual, but the distortion occurring to the signal waveform of a certain bit differs according to the peripheral bits (bits transmitted before and after the bit) of the bit thereof.

That is to say, FIGS. 5A and 5B show the waveform of the receiving signal received at the receiving side in the case of transmitting with cable communication and in the case of transmitting the unit bit string with in-casing wireless communication.

Note that with the waveform of the receiving signal in FIGS. 5A and 5B, the horizontal axis expresses time, and the vertical axis expresses amplitude of the receiving signal. Also, the amplitude of the signal when transmitting a bit is, for example, −0.3V (volt) when at bit "0", and for example +0.3V when at bit "1", respectively.

Hereafter, each bit of the N bits which are in a unit bit string are denoted as $b_1$, $b_2$, and so on through $b_N$, in the order of being transmitted (also in the order of being received). Also, the n'th bit bn (the bit transmitted the n'th time) of the unit bit string ("0" or "1") is also called the n'th bit.

FIG. 5A shows a waveform of the receiving signal "1" of the fifth bit in the case that 6 bits "010111" are a unit bit string and the unit bit string is transmitted with cable communication multiple times.

Note that in FIG. 5A, the black lines indicate multiple receiving signals corresponding to the unit bit string transmitted multiple times, and the blank portion in between indicates average values of the multiple receiving signals.

With cable communications, there is no multipath influence on the unit bit string signal, and there is only influence of the transmission side and reception side circuits and so forth (circuit influence), whereby the amplitude of the receiving signal of the fifth bit is fairly constant, and dispersion thereof is small.

FIG. 5B shows a waveform of the receiving signal "1" of the fifth bit in the case that 6 bits "010111" are a unit bit string and the unit bit string is transmitted with in-casing wireless communication multiple times.

Note that in FIG. 5B also, similar to FIG. 5A, the black lines indicate multiple receiving signals corresponding to the unit bit string transmitted multiple times, and the blank portion in between indicates average values of the multiple receiving signals.

With the in-casing wireless communication, the unit bit string signal receiving multipath influence (effects of interference due to multipath) as well as circuit influence, and as a result, the fifth receiving signal is distorted more than the case in FIG. 5A.

For example, if we say that 0.0 V is a threshold, a receiving signal at or greater than the threshold is reproduced (determined) as bit "1", and the receiving signal at or below the threshold is reproduced (solid determination) as bit "0", the receiving signal of the fifth bit which is "1" in FIG. 5B has a portion wherein the amplitude is less than the threshold, whereby in this case, the fifth bit can be erroneously reproduced as "0".

The circuit influence may include reflections at the connector end in the path that the signal passes through, or filter effects in the circuit. Filter effects refer to filter features that the filter itself has in the circuit or that parts in the circuit have, i.e. that a part of frequency components of the signal passing through the circuit are cut due to the upper limit and lower limit of the frequency components of the signal passing through the circuit, or that frequency components of the signal passing through the circuit becomes frequency components of a portion of the signal.

If we focus on a certain bit in the unit bit string as the bit of interest, the frequency components of the signal passing through from the filter effects depend on, for example, convolution of the signal of the bit of interest with the signals of the bits before and after, whereby the waveform of the receiving signal of the receiving bit is dependent on the bits before and after.

For example, with the unit bit string "010111" shown in FIGS. 5A and 5B, in the case that the "1" in the fifth bit serves as the bit of interest, the fourth bit before the bit of interest and the sixth bit thereafter each are the same "1" as the bit of interest, whereby there is no sudden change (rising edge or trailing edge) to the signal between the fourth bit and fifth bit, and between the fifth bit and sixth bit, i.e. there are no high frequency components cut with the filter effect, whereby in the case of considering only influences from the circuits, the waveform of the receiving signal of the fifth bit which is the bit of interest becomes nearly linear.

On the other hand, the influence from multipath appears as multipath fading, by multiple waves (multipath) such as direct waves, reflecting waves, and diffracted waves interfering.

Particularly, with the wireless communication in a closed space such as the in-casing wireless communication, there is little divergence of waves, whereby deterioration of reflecting waves is small, and the influence of the reflecting waves continue across several bits. As a result, the distortion of the receiving signal becomes great, and for example, as shown in FIG. 5B, the amplitude of the receiving signal of the bit of interest which is "1" (fifth bit) becomes less than the threshold, and the bit of interest can erroneously be reproduced as "0".

However, in FIG. 5B the dispersion of the receiving signal is limited to a constant range. Further, the waveform of the receiving signal is not a constant, but is distorted, but the manner of distortion thereof has a constant trend (continuity).

With the in-casing wireless communication, the receiving signal received at the receiving side becomes the signal that the transmission signal transmitted from the transmission side receives circuit influence and multipath influence.

The circuit influence and multipath influence that the transmission signal receives has constancy, and the influence that the transmission signal of the bit of interest receives depends on the bit (row) transmitted in the past and in the future of the bit of interest (the bit (row) transmitted before the bit of interest and the bit (row) transmitted after the bit of interest).

Figure 6:
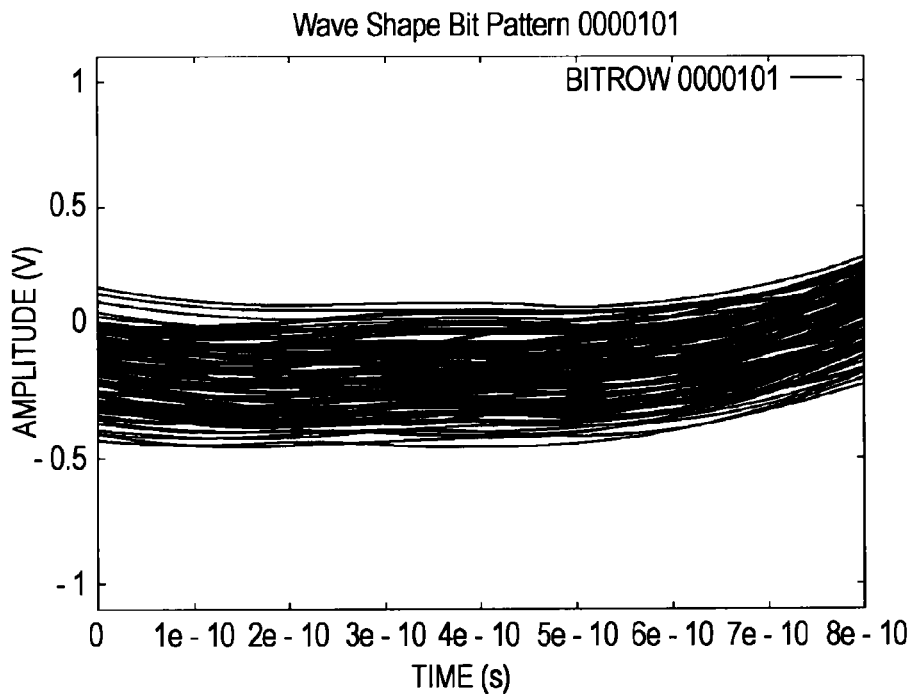
FIG. 6 is a waveform diagram illustrating a receiving signal received with wireless communication in the casing.
Figure 7:
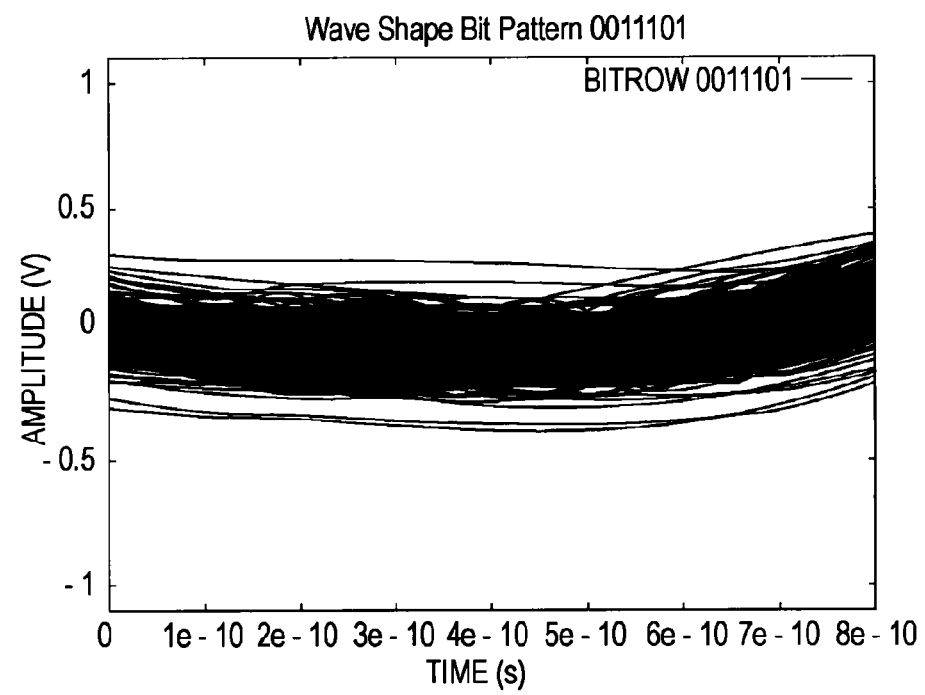
FIG. 7 is a waveform diagram illustrating a receiving signal received with wireless communication in the casing.
Figure 8:
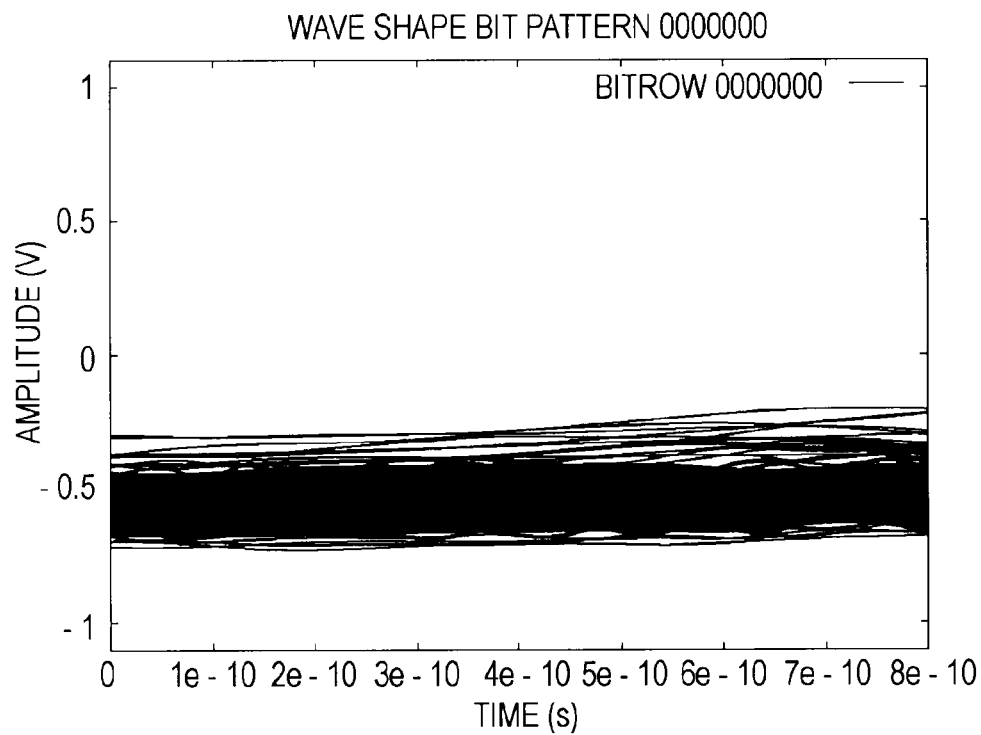
FIG. 8 is a waveform diagram illustrating a receiving signal received with wireless communication in the casing.

FIGS. 6 through 8 show waveforms of the receiving signal of the bit of interest worth multiple times of transmissions, wherein, in the case with in-casing wireless communication, the bit string of seven bits is transmitted several times as a unit bit string, and the sixth bit of such unit bit string is set to be the bit of interest.

That is to say, FIG. 6 shows the waveform of the receiving signal of the sixth bit "0" serving as the bit of interest of the unit bit string "0000101" (unit bit string wherein the bit pattern is "000101").

Also, FIG. 7 shows the waveform of the receiving signal of the sixth bit "0" serving as the bit of interest of the unit bit string "0011101", and FIG. 8 shows the waveform of the receiving signal of the sixth bit "0" serving as the bit of interest of the unit bit string "0000000".

The waveforms of the receiving signals in FIGS. 6 through 8 each are a waveform of a bit "0" receiving signal, but each have different manners of distortion for each bit pattern of the unit bit string, whereby the distance to 0.0V which is the threshold differs by bit pattern of the unit bit string.

However, the manner of distortion of receiving signal waveforms has a constant tendency for each bit pattern.

Therefore, the error rate that the bit of interest of the unit bit string will have an error differs for each bit pattern of the unit bit string, and depends on such bit pattern.

Figure 9:
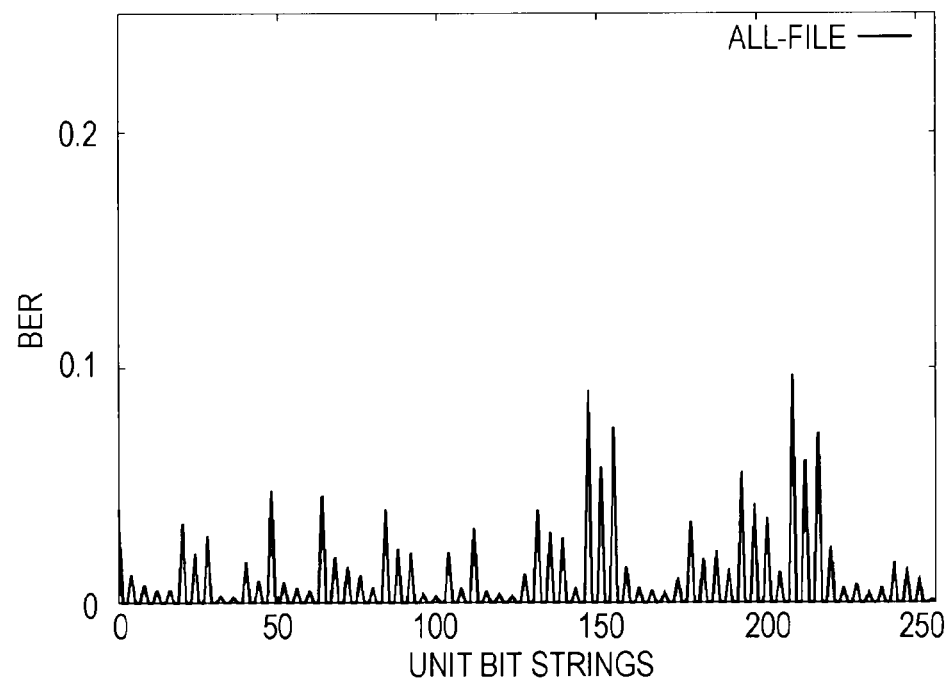
FIG. 9 is a diagram illustrating an error rate of the 7th bit within 8 bits when 8 bits are transmitted.

FIG. 9 shows an error rate of the bit of interest in the case that an 8-bit bit string serves as a unit bit string, and the seventh bit of such unit bit string serves as the bit of interest. In FIG. 9, the horizontal axis represents bit patterns of the unit bit string, and the vertical axis represents the error rate (Ber).

Note that for the bit pattern "$b1, b2, b3, b4, b5, b6, b7, b8$" of the 8-bit unit bit string there are 256 patterns from "00000000" to "11111111", but in FIG. 9, the bit pattern "$b1, b2, b3, b4, b5, b6, b7, b8$" is expressed as a binary number, and shows the value expressing the binary number thereof with decimal numbers (0 through 255) on the horizontal axis.

According to FIG. 9, we can see that a bit pattern wherein errors of the seventh bit serving as the bit of interest can easily occur, and a bit pattern wherein errors do not easily occur.

Thus, with the in-casing wireless communication, the manner of distortion of the waveform of the receiving signal has a constant trend for each bit patter, and consequently has a feature wherein there is a bit pattern that the bit of interest easily errs, and a bit pattern that does not easily err.

With the signal router 45 serving as the transmission device and the functional block 46 serving as the receiving device, the above-described in-casing wireless communication features are used to readily prevent occurrences of data errors that result from multipath.

Figure 10:
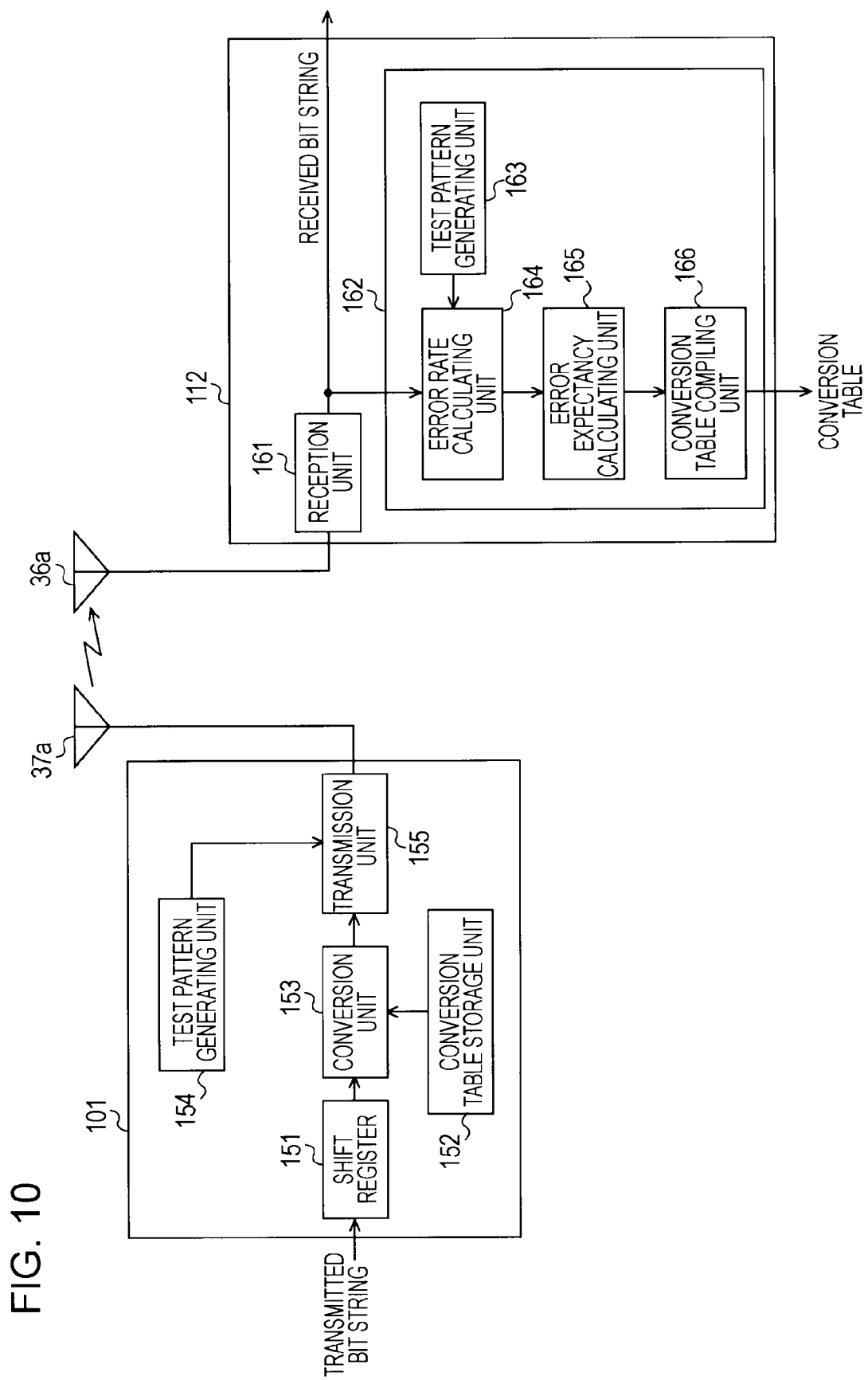
FIG. 10 is a block diagram illustrating a configuration example of a transmission processing unit and reception processing unit.

That is to say, FIG. 10 shows a configuration example of the transmission processing unit 101 (FIG. 4) of the signal router 45 serving as the transmission device and the reception processing unit 112 (FIG. 4) of the functional block 46 serving as the reception device.

The transmission processing unit 101 is made up of a shift register 151, conversion table storage unit 152, conversion unit 153, test pattern generating unit 154, and transmission unit 155, and functions as a transmission device to transmit the transmission bit string which is an arrangement of the unit bit string.

That is to say, the transmission bit string which is an arrangement of the unit bit string expressing a pixel value of an image, for example, is supplied from the signal processing unit 103 (FIG. 4) to the shift register 151. The shift register 151 latches (stores) the transmission bit string supplied thereto, one bit at a time sequentially, and when N bits, i.e. the unit bit string is latched, the unit bit string is supplied to the conversion unit 153.

The conversion table storage unit 152 stores a conversion table which correlates (each bit pattern of) the unit bit string and a conversion bit string to be described later.

The conversion unit 153 converts the unit bit string from the shift register 151 into a converted bit string, in accordance with the conversion table stored in the conversion table storage unit 152, and supplies this to the transmission unit 155.

The test pattern generating unit 154 generates a test pattern which is a bit pattern of N bits which the unit bit string can assume, and supplies this to the transmission unit 155. The transmission unit 155 modulates the converted bit string from the conversion unit 153 or the test pattern from the test pattern generating unit 154, and transmits the modulated signal obtained by such modulation from the antenna 37*a*.

The reception processing unit 112 is made up of a reception unit 161 and compiling unit 162. The reception unit 161 receives the modulated signal transmitted from the transmission processing unit 101 via the antenna 36*a*, and demodulates this into a baseband signal (receiving signal). Further, the reception unit 161 compares the receiving signal and the predetermined threshold, whereby the converted bit string or bit string serving as a test pattern is reproduced, and supplied to the compiling unit 162 and the signal processing unit 113 (FIG. 4).

The compiling unit 162 is made up of a test pattern generating unit 163, error rate computing unit 164, error expectancy computing unit 165, and conversion table compiling unit 166, and functions as the information processing device to compile the conversion table used to convert the unit bit string into a converted bit string.

That is to say, the test pattern generating unit 163 generates a test pattern which is a bit pattern of N bits which the unit bit string can assume, and supplies this to the error rate computing unit 164. Note that the test pattern generating unit 163 generates the same test pattern in the same order as the test pattern generating unit 154 of the transmission processing unit 101.

The test pattern generated by the test pattern generating unit 163 (hereafter, also called generated test pattern, as appropriate) is supplied to the error rate computing unit 164, and also the test pattern reproduced by the receiving unit 161, i.e. the test pattern obtained by the receiving unit 161 receiving and reproducing the test pattern transmitted by the transmission processing unit 101 (hereafter, also called received test pattern, as appropriate) is supplied to the error rate computing unit 164.

The error rate computing unit 164 compares the generated test pattern from the test pattern generating unit 163 and the received test pattern from the receiving unit 161, whereby when the test pattern is transmitted from the transmission processing unit 101 to the reception processing unit 112, the error rate that the k'th bit which is a certain one bit of the test pattern thereof errs is obtained, and the error rate for each test pattern is supplied to the error expectancy computing unit 165.

That is to say, if we focus on a certain generated test pattern which the test pattern generating unit 163 generates as a test pattern of interest, the error rate computing unit 164 counts the occurrence frequency which is the number of times the test pattern generating unit 163 generates the test pattern of interest.

Further, the error rate computing unit 164 compares the test pattern of interest and the received test pattern corresponding to the test pattern of interest, and counts the number of errors which is the number of times that the k'th bit of the received test pattern does not match the k'th bit of the test pattern of interest, i.e. the number of times that the k'th bit errs.

The error rate computing unit 164 divides the number of errors of the test pattern of interest by the occurrence frequency of the test pattern of interest, whereby the divided value (quotient) is obtained as the error rate of the test pattern of interest.

For each of multiple bit patterns that an insignificant bit can assume, which is a bit that is not significant out of the N bits of the unit bit string (hereafter called changed bit pattern), the error expectancy computing unit 165 obtains the error expectancy which is the expected rate that a significant bit, which is a bit in the N bits in the unit bit string that is significant, errs, using the error rate supplied from the error rate computing unit 164 (the error rate of the test pattern wherein the significant bit of the N bits in the unit bit string serves as the k'th bit, as described later), and supplies this to the conversion table compiling unit 166.

For example, regarding a pixel value of an image, in the case that an error occurs in a higher-order bit, particularly in an MSB (Most Significant Bit), the image quality greatly deteriorates, but even if an error occurs in a lower-order bit such as an LSB (Least Significant Bit), deterioration of image quality is not visually noticeable.

Accordingly, even if the lower-order bit of the pixel value is sacrificed, this should not cause an error to a higher-order bit. Audio and so forth is the same in this point.

Accordingly, in the case that the unit bit string is a pixel value, for example, we can say that the higher-order bit is a significant bit, and the lower-order bit is an insignificant bit.

The conversion table compiling unit 166 compiles a conversion table which correlates the unit bit string and a converted bit string which is obtained by converting an insignificant bit from the unit bit string thereof into a smallest error expectancy bit pattern which is a bit pattern that minimizes the error expectancy from the error expectancy computing unit 165 of the multiple changed bit patterns.

The conversion table compiled with the conversion table compiling unit 166 is stored in the conversion table storage unit 152 of the transmission processing unit 101.

Next, the schematics of the wireless communication (incasing wireless communication) performed between the transmission processing unit 101 and the reception processing unit 112 in FIG. 10 will be described.

Each bit of data exchanged with communication is one of a "0" or "1", but expresses various types of information. That is to say, the bit expresses various types of information, such as pixel value of an image, audio frequency components, portions used for synchronizing the communication, and error correcting unit (error correcting encoding) and so forth, for example. The significance of each bit differs depending on the information that the bit expresses.

That is to say, in the case that the bit expresses a pixel value of an image, for example, the significance of the bit differs depending on whether the bit thereof is a higher-order bit of the pixel value or a lower-order bit.

Specifically, with image communication in real-time that is not retransmitted, for example, even if an error occurs during transmission of the pixel value making up the image, the image is displayed on the receiving side using the pixel values with errors having occurred.

As described above, regarding pixel values of the image, in the case that an error occurs to the higher-order bit, the image quality greatly deteriorates, but even if an error occurs to the lower-order bit, the image quality deterioration is not visually noticeable.

That is to say, regarding the pixel values, even if the number of bits with errors occurring is the same, in the case that the bits with errors occurring are higher-order bits, the influence to the image quality is great, and in the case that the bits with errors occurring are lower-order bits, the influence to the image quality is small.

Accordingly, in the case that the unit bit string is a pixel value, for example, we can say that the higher-order bits are significant bits and the lower-order bits are insignificant bits.

With the transmission processing unit 101 and reception processing unit 112 in FIG. 10, using the information that there is a bit pattern wherein bit errors generated as a result of multipath easily occur and a bit pattern wherein bit errors are not easily generated, permits an insignificant bit to be sacrificed, whereby error occurrence of significant bits can be prevented.

Specifically, for example, a 4-bit bit string is a unit bit string "$b_1, b_2, b_3, b_4$", and the error rate of an error occurring to the last 4th bit $b_4$ when transmitting the unit bit string "$b_1, b_2, b_3, b_4$" is expressed as $C_4(b_1, b_2, b_3, b_4)$.

Also, let us say for example that with the unit bit string "$b_1, b_2, b_3, b_4$", first bit $b_1$ and the second bit $b_2$ are insignificant bits and the third bit $b_3$ and fourth bit $b_4$ are significant bits.

Now, if we say that when transmitting the unit bit string "$b_1, b_2, b_3, b_4$", the error expectancy is expressed as $E_{3,4}(b_1, b_2, b_3, b_4)$ which is the expected value of at least one of the third bit $b_3$ and fourth bit $b_4$, which are significant bits, of the unit bit string "$b_1, b_2, b_3, b_4$", erring, and the error expectancy $E_{3,4}(b_1, b_2, b_3, b_4)$ thereof is obtained using the error rate $C_4(b'_1, b'_2, b'_3, b'_4)$ that the last fourth bit $b'_4$ error when transmitting the 4-bit "$b'_1, b'_2, b'_3, b'_4$", then the error expectancy $E_{3,4}(b_1, b_2, b_3, b_4)$ is obtained with the Expression (1).

$$E_{3,4}(b_1,b_2,b_3,b_4)=C_4(b_1,b_2,b_3,b_4)+(C_4(0,b_1,b_2,b_3)+C_4(1,b_1,b_2,b_3))/2 \qquad (1)$$

Thus, with Expression (1), upon transmitting the bit string "$b_1, b_2, b_3, b_4$", the first term on the right side $C_4(b_1, b_2, b_3, b_4)$ expresses the error expectancy that the fourth bit $b_4$ will err, and equates to the error rate.

Also, with Expression (1), when the 4-bit "$x_1, b_1, b_2, b_3$" is transmitted, with the second term on the right side $(C_4(0, b_1, b_2, b_3)+C_4(1, b_1, b_2, b_3))/2$ expressing an uncertain value (bit) wherein x is one of "0" or "1", the error expectancy of the fourth bit $b_3$ erring is shown.

With Expression (1), if the probability of an indefinite value x being "0" and the probability of "1", i.e., the occurrence probability that "0" will be generated as the bit x of one prior bit and the occurrence probability that "1" is generated with a bit x that is one bit prior to the unit bit string "$b_1, b_2, b_3, b_4$" are each ½ and are equal, and when the 4-bit "$x_1, b_1, b_2, b_3$" is transmitted, the error expectancy that the 4th bit $b_3$ will err is obtained.

On the other hand, for multiple bit patterns (changed bit patterns) "$b_1, b_2$" which the first bit $b_1$ and second bit $b_2$, which are insignificant bits of the unit bit string "$b_1, b_2, b_3, b_4$" can assume, there are four patterns of "0, 0", "0, 1", "1, 0", and "1, 1".

With the presumption that the errors of the first bit $b_1$ and second bit $b_2$ which are insignificant bits are permitted errors, in order to avoid errors occurring to the third bit $b_3$ and fourth bit $b_4$ which are significant bits, for each of the changed bit patterns "0, 0", "0, 1", "1, 0", and "1, 1" the error expectancy $E_{3,4}(b_1, b_2, b_3, b_4)$ wherein one of the significant bits $b_3$ and $b_4$ will be in error, i.e. the error expectancies $E_{3,4}(0, 0, b_3, b_4)$, $E_{3,4}(0, 1, b_3, b_4)$, $E_{3,4}(1, 0, b_3, b_4)$, and $E_{3,4}(1, 1, b_3, b_4)$ are obtained, and the insignificant bits $b_1$ and $b_2$ of the unit bit string "$b_1, b_2, b_3, b_4$" are converted into a change pattern to minimize the error expectancy $E_{3,4}(b_1, b_2, b_3, b_4)$ of the changed bit patterns "0, 0", "0, 1", "1, 0", and "1, 1" (hereafter also referred to as "smallest error expectancy bit pattern"), and transmitted.

A bit string obtained by converting an insignificant bit of the unit bit string to a smallest error expectancy bit pattern is also called a converted bit string.

In FIG. 10, with the compiling unit 162 of the receiving processing unit 112, a conversion table is compiled wherein the unit bit string and the converted bit string obtained by converting the insignificant bit of the unit bit string into a smallest error expectancy bit pattern are correlated.

With the transmission processing unit 101, the unit bit string is converted to a converted bit string with the conversion unit 153 in accordance with the conversion table, and the converted bit string thereof is transmitted with the transmission unit 155.

Note that in the above-described case, the bit before the one bit of the unit bit string "$b_1, b_2, b_3, b_4$" is an undefined value x, but an arrangement may be made wherein with the transmission processing unit 101, the bit $b_0$ which is transmitted one bit before the unit bit string converted to a converted bit string with the converting unit 153 is stored, whereby when the 4-bit "$x, b_1, b_2, b_3$" is transmitted, the error expectancy $E_{3,4}(b_1, b_2, b_3, b_4)$ in Expression (1) can be obtained by using the error rate $C_4(b_0, b_1, b_2, b_3)$ where the fourth bit $b_3$ errs when the 4-bit "$b_0, b_1, b_2, b_3$" is transmitted, as the error expectancy $(C_4(0, b_1, b_2, b_3)+C_4(1, b_1, b_2, b_3))/2$ that the fourth bit $b_3$ will err.

Next, compiling the conversion table with the compiling unit 162 in FIG. 10 will be described with reference to FIGS. 11A through 11F.

Figure 11:
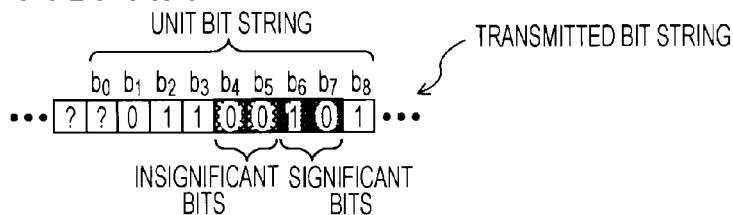
FIGS. 11A through 11F are diagrams describing a method to compile a conversion table.

FIG. 11A shows a certain unit bit string in a transmission bit string. In FIG. 11A, the unit bit string is an 8(=N)-bit bit string "$b_1, b_2, b_3, b_4, b_5, b_6, b_7, b_8$", wherein the fourth bit $b_4$ and fifth bit $b_5$ are each insignificant bits, and the sixth bit $b_6$ and seventh bit $b_7$ are each significant bits. In FIG. 11A, (the bit pattern of) the 8-bit unit bit string "$b_1, b_2, b_3, b_4, b_5, b_6, b_7, b_8$" is "0, 1, 1, 0, 0, 1, 0, 1". Also, in FIG. 11A, the bit b0 that is one bit before the "0, 1, 1, 0, 0, 1, 0, 1" of the unit bit string "$b_1, b_2, b_3, b_4, b_5, b_6, b_7, b_8$" (and bits prior to that) are an undefined value x.

Thus, in FIG. 11A, the number of bits for insignificant bits and significant bits are the same, but the number of bits for insignificant bits and significant bits do not have to be the same. For example, for an 8-bit test pattern that can assume a bit string "$b_1, b_2, b_3, b_4, b_5, b_6, b7, b_8$", in the error rate computing unit 164 of the compiling unit 162 (FIG. 10), the error rate $C_7(b_1, b_2, b_3, b_4, b_5, b_6, b_7, b_8)$ that of the 8 bits, the seventh bit for example will err is obtained, and supplied to the error expectancy computing unit 165.

With the error rate computing unit 164, the bit for which the error rate is obtained is also called an error detection bit. In this case, the seventh bit is the error detection bit.

With the unit bit string "$b_1, b_2, b_3, b_4, b_5, b_6, b_7, b_8$" in FIG. 11A, the insignificant bits are the two bits of the fourth bit $b_4$ and the fifth bit $b_5$, whereby the changed bit pattern that the insignificant bits "$b_4, b_5$" can assume has the four patterns of "0, 0", "0, 1", "1, 0", and "1, 1".

Thus, with the error expectancy computing unit 165, first, one of the four changed bit patterns "0, 0", "0, 1", "1, 0", and "1, 1", i.e. for example using the first changed bit pattern "0, 0" as a bit pattern of interest, the error expectancy that one of the significant bits $b_6$ and $b_7$ of the unit bit string "$b_1, b_2, b_3, b_4, b5, b_6, b_7, b_8$"="0, 1, 1, 0, 0, 1, 0, 1", 0, 0, 1, 1 will err (hereafter also referred to as error expectancy regarding bit pattern of interest "0, 0") is obtained as shown in FIG. 11B.

The error expectancy for the bit pattern of interest "0, 0" means the error expectancy EE (0, 1, 1, 0, 0, 1, 0, 1) that one of the significant bits $b_6$ and $b_7$ of the bit string "0, 1, 1, 0, 0, 1, 0, 1" obtained by the insignificant bits $b_4$ and $b_5$ of the unit bit string "$b_1, b_2, b_3, b_4, b_5, b_6, b_7, b_8$"="0, 1, 1, 0, 0, 1, 0, 1" are replaced with the bit pattern of interest "0, 0".

When the 8-bit bit pattern "$b'_1, b'_2, b'_3, b'_4, b'_5, b'_6, b'_7, b'_8$" which can assume an 8-bit unit bit string is transmitted, if we express the error rate that the seventh bit $b'_7$ which is an error detection bit has erred is expressed as $C_7(b'_1, b'_2, b'_3, b'_4, b'_5, b'_6, b'_7, b'_8)$, similar to the case in Expression (1), the error expectancy EE (0, 1, 1, 0, 0, 1, 0, 1) for the bit pattern of interest "0, 0" can be obtained using the error rate $C_7(b'_1, b'_2, b'_3, b'_4, b'_5, b'_6, b'_7, b'_8)$ obtained with the error rate computing unit 164.

That is to say, with the error expectancy computing unit 165, one of the significant bits b6 and $b_7$ of the unit bit string "$b_1, b_2, b_3, b_4, b_5, b_6, b_7, b_8$"="0, 1, 1, 0, 0, 1, 0, 1", i.e. for example the significant bit b7 is caused to be a significant bit of interest, and with the transmission bit string, the 8(=N)-bit string which is the same as the unit bit string becomes a substitute bit string for performing substitution of insignificant bits, wherein the significant bit of interest $b_7$ is the seventh bit which is an error detection bit.

For the unit bit string "$b_1, b_2, b_3, b_4, b_5, b_6, b_7, b_8$"="0, 1, 1, 0, 0, 1, 0, 1", in FIG. 11A, the 8-bit bit string, which has the significant bit of interest $b_7$ as the seventh bit serving as the error detection bit with the transmission bit string, is a unit bit string, and accordingly the unit bit string "$b_1, b_2, b_3, b_4, b_5, b_6, b_7, b_8$"="0, 1, 1, 0, 0, 1, 0, 1", becomes the bit string to be substituted.

Further, with the error expectancy computing unit 165, the bit string "0, 1, 1, 0, 0, 1, 0, 1" obtained by substituting the insignificant bits $b_4$ and $b_5$ in the substitution bit string "$b_1, b_2, b_3, b_4, b_5, b_6, b_7, b_8$"="0, 1, 1, 0, 0, 1, 0, 1" with the bit pattern of interest "0, 0" is obtained as the substitution bit string, and the error expectancy that the significant bit $b_7$ of interest of the substitution bit string, i.e. the 7th bit serving as the error detection bit making an error is obtained.

In this case, the substitution bit string is "0, 1, 1, 0, 0, 1, 0, 1", and all of the bits are known, so the error expectancy that the significant bit of interest $b_7$ of the substitution bit string will err becomes the error rate $C_7(0, 1, 1, 0, 0, 1, 0, 1)$ of the bit string "0, 1, 1, 0, 0, 1, 0, 1" obtained with the error rate computing unit 164.

With the error expectancy computing unit 165, the error expectancy that the significant bit of interest will err is obtained with all of the significant bits as significant bits of interest, whereby the multiplied value of the error expectation for all of the significant bits can be obtained as error expectancies for the bit pattern of interest "0, 0".

That is to say, with the error expectancy computing unit 165, if the significant bit $b_7$ of the significant bits $b_6$ and $b_7$ becomes a significant bit of interest and the error expectancy of such significant bit of interest $b_7$ is obtained, an error expectancy for the significant bit $b_6$ which is not yet a significant bit of interest, of the significant bits $b_6$ and $b_7$, newly becomes a significant bit of interest, and the error expectancy for the significant bit of interest $b_6$ is obtained similar to the case described above.

Specifically, with the error expectancy computing unit 165, in the transmission bit string, the 8(=N)-bit bit string which is the same as the unit bit string wherein the significant bit of interest $b_6$ serves as the 7th bit which is the error detection bit becomes the substitute bit string for performing substitution for the insignificant bits.

Regarding the unit bit string "$b_1, b_2, b_3, b_4, b_5, b_6, b_7, b_8$"="0, 1, 1, 0, 0, 1, 0, 1" in FIG. 11A, the 8-bit bit string wherein with the transmission bit string, the significant bit of interest $b_6$ serves as the 7th bit which is an error detection bit, is a bit string "bog $b_1, b_2, b_3, b_4, b_5, b_6, b_7$"="x, 0, 1, 1, 0, 0, 1, 0" which is shifted towards the past by one bit from the unit bit string, and accordingly, the bit string "$b_0, b_1, b_2, b_3, b_4, b_5, b_6, b_7$"="x, 0, 1, 1, 0, 0, 1, 0" becomes a bit string for substitution.

Further, with the error expectancy computing unit 165, the bit string "x, 0, 1, 1, 0, 0, 1, 0" obtained by substituting the insignificant bits $b_4$ and $b_5$ in the substitution bit string "$b_0, b_1, b_2, b_3, b_4, b_5, b_6, b_7$"="x, 0, 1, 1, 0, 0, 1, 0" with the bit pattern of interest "0, 0" is obtained as a substitution bit string, and the significant bit of interest $b_6$ of the substitution bit string, i.e. the error expectancy for the 7th bit serving as the error detection bit is obtained.

In this case, the substitution bit string is "x, 0, 1, 1, 0, 0, 1, 0", and includes one undefined value x. Similar to the case with Expression (1), if we say that the occurrence probability of "0" to occur as the undefined value x and the occurrence probability of "1" to occur is the same, the error expectancy for the significant bit of interest $b_6$ becomes the average value $((C_7(0, 0, 1, 1, 0, 0, 1, 0) + C_7(1, 0, 1, 1, 0, 0, 1, 0))/2)$ of the error rate $C_7(0, 0, 1, 1, 0, 0, 1, 0)$ of the substitution bit row "10, 0, 1, 1, 0, 0, 1, 0" in the case that the undefined value x is "0" and the error rate $C_7(1, 0, 1, 1, 0, 0, 1, 0)$ of the substitution bit row "1, 0, 1, 1, 0, 0, 1, 0" in the case that the undefined value is "1".

Thus, with the error expectancy computing unit 165, the error expectancy of the significant bit of interest is obtained with all of the significant bits $b_6$ and $b_7$ as significant bits of interest, and the multiplied value of the error expectancies for all of the significant bits $b_6$ and $b_7$ is obtained as the error expectancy for the bit pattern of interest "0, 0", i.e. as an error expectancy for one of the significant bits $b_6$ and $b_7$ erring, when transmitting the bit string "0, 1, 1, 0, 0, 1, 0, 1" obtained by substituting the insignificant bits $b_4$ and $b_5$ of the "$b_1, b_2, b_3, b_4, b_5, b_6, b_7, b_8$"="0, 1, 1, 0, 0, 1, 0, 1" with the bit pattern of interest "0, 0".

FIG. 11B shows a method for obtaining the error expectancy for the bit pattern of interest "0, 0".

As described above, in the case that the significant bit $b_7$ of the significant bits b6 and $b_7$ are significant bit of interest, with the bit pattern of interest "0, 0", the error expectancy for such significant bit $b_7$ thereof will be the error rate $C_7(0, 1, 1, 0, 0, 1, 0, 1)$ of the substitution bit string "0, 1, 1, 0, 0, 1, 0, 1".

Further, with the bit pattern of interest "0, 0", in the case that the significant bit $b_6$ of the significant bits $b_6$ and $b_7$ is the significant bit of interest, the error expectancy for such significant bit of interest $b_6$ becomes an average value $((C_7(0, 0, 1, 1, 0, 0, 1, 0) + C_7(1, 0, 1, 1, 0, 0, 1, 0))/2)$ of the error rate $C_7(0, 0, 1, 1, 0, 0, 1, 0)$ of the substitution bit string "0, 0, 1, 1, 0, 0, 1, 0" and the error rate $C_7(1, 0, 1, 1, 0, 0, 1, 0)$ of the substitution bit string "1, 0, 1, 1, 0, 0, 1, 0".

In FIG. 11B, the error rate $C_7(0, 1, 1, 0, 0, 1, 0, 1)$ of the substitution bit string "0, 1, 1, 0, 0, 1, 0, 1" becomes 0.01883, the error rate $C_7(0, 0, 1, 1, 0, 0, 1, 0)$ of the substitution bit string "0, 0, 1, 1, 0, 0, 1, 0" becomes 0.00886, and the error rate $C_7(1, 0, 1, 1, 0, 0, 1, 0)$ of the substitution bit string "1, 0, 1, 1, 0, 0, 1, 0" becomes 0.03407.

Accordingly, the error expectancy for the significant bit b7 becomes the 0.01883 with the error rate $C_7(0, 1, 1, 0, 0, 1, 0, 1)$ of the substitution bit string "0, 1, 1, 0, 0, 1, 0, 1".

Also, the error expectancy for the significant big $b_6$ becomes the average value (0.00886+0.03407)/2 of the 0.00886 with the error rate $C_7(0, 0, 1, 1, 0, 0, 1, 0)$ of the substitution bit string "0, 0, 1, 1, 0, 0, 1, 0" and the 0.03407 with the error rate $C_7(1, 0, 1, 1, 0, 0, 1, 0)$ of the substitution bit string "1, 0, 1, 1, 0, 0, 1, 0".

Accordingly, the error expectancy for the bit pattern of interest "0, 0" becomes 0.023348 which is a value multiplying the error expectancy 0.01883 for the significant bit $b_7$ with the error expectancy for the significant bit $b_6$ (0.00886+0.03407)/2.

The error expectancy computing unit 165 obtains the error expectancy for each of the four changed bit patterns "0, 0", "0, 1", "1, 0", and "1, 1" as bit patterns of interest.

FIG. 11C shows the way to obtain the error expectancy value of the changed bit pattern "0, 1", FIG. 11D shows the way to obtain the error expectancy value of the changed bit pattern "1, 0", and FIG. 11E obtains the way to obtain the error expectancy value of the changed bit pattern "1, 1".

In FIG. 11C, 0.04244 is obtained as the error expectancy for the changed bit pattern "0, 1", in FIG. 11D, 0.01761 is obtained as the error expectancy for the changed bit pattern "1, 0", and in FIG. 11E, 0.0137 is obtained as the error expectancy for the changed bit pattern "1, 1".

Thus, with the error expectancy computing unit 165, upon the error expectancy being obtained for all of the changed bit patterns "0, 0", "0, 1", "1, 0", and "1, 1", the error expectancy for each of the changed bit patterns "0, 0", "0, 1", "1, 0", and "1, 1" are supplied to the conversion table compiling unit 166.

The conversion table compiling unit 166 obtains a smallest error expectancy bit pattern which is a bit pattern that minimizes the error expectancy from the error expectancy computing unit 165 of "0, 0", "0, 1", "1, 0", and "1, 1".

FIG. 11F shows the error expectancy for each of the changed bit patterns "0, 0", "0, 1", "1, 0", and "1, 1" obtained with the unit bit string "$b_1, b_2, b_3, b_4, b_5, b_6, b_7, b_8$"="0, 1, 1, 0, 0, 1, 0, 1" and the order in the smallest order of the error expectancies thereof.

In FIG. 11F, the error expectancy for the changed bit pattern "1, 1" of the changed bit patterns "0, 0", "0, 1", "1, 0", and "1, 1" shows as 0.0137 and is the smallest, whereby the changed bit pattern "1, 1" is obtained as the smallest error expectancy bit pattern.

Regarding the unit bit string "$b_1, b_2, b_3, b_4, b_5, b_6, b_7, b_8$" other than "0, 1, 1, 0, 0, 1, 0, 1", similarly the conversion table compiling unit 166 obtains the smallest error expectancy bit pattern, whereby a conversion table is compiled that correlates the unit bit string "$b_1, b_2, b_3, b_4, b_5, b6, b_7, b_8$" for each bit pattern and a converted bit string obtained by converting the insignificant bits $b_4$ and $b_5$ of the unit bit string "$b_1, b_2, b_3, b_4, b5, b_6, b_7, b_8$" into a smallest error expectancy bit pattern.

FIG. 12 shows an example of a conversion table. In FIG. 12, each Bit Pattern of the unit bit string and the smallest error expectancy bit pattern are correlated. In FIG. 12, X expresses a so-called "don't care".

In the conversion table in FIG. 12, for example an entry (record) wherein the bit pattern "0, 0, 0, X, X, 0, 0, 0" of the unit bit string "$b_1, b_2, b_3, b_4, b_5, b_6, b_7, b_8$" and the smallest error expectancy bit pattern "1, 1" are correlated shows that the unit bit string "$b_1, b_2, b_3, b_4, b_5, b_6, b_7, b_8$" of the bit pattern "0, 0, 0, X, X, 0, 0, 0" and the converted bit string "0, 0, 0, 1, 1, 0, 0, 0" obtained by converting the insignificant bits $b_4$ and $b_5$ thereof into the smallest error expectancy bit pattern "1, 1" are correlated.

Accordingly, the unit bit string of the bit pattern "0, 0, 0, X, X, 0, 0, 0", i.e. the unit bit strings of the bit patterns "0, 0, 0, 0, 0, 0, 0, 0", "0, 0, 0, 0, 1, 0, 0, 0", "0, 0, 0, 1, 0, 0, 0, 0", and "0, 0, 0, 1, 1, 0, 0, 0" are each converted into the converted bit string "0, 0, 0, 1, 1, 0, 0, 0".

Figure 13:
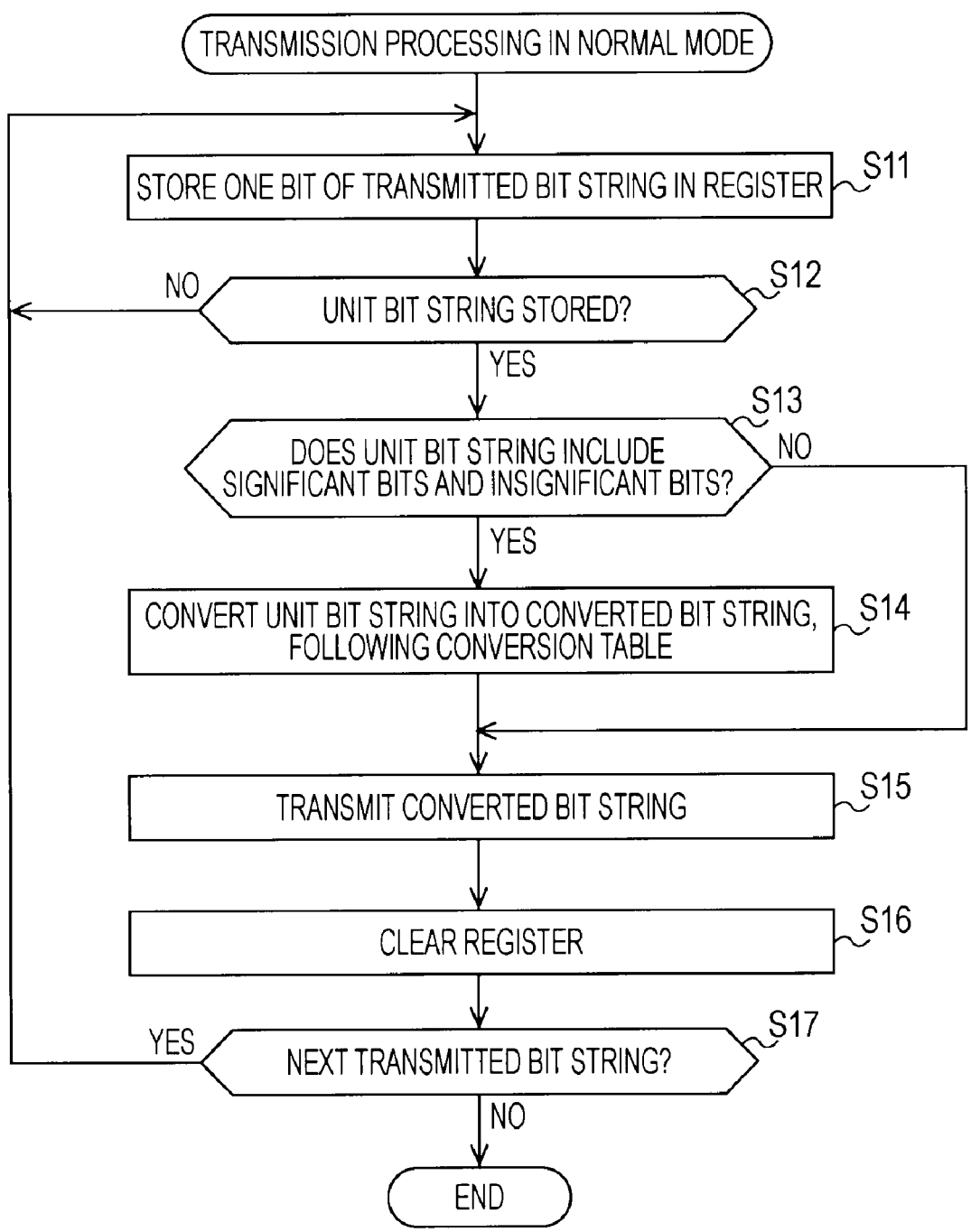
FIG. 13 is a flowchart describing transmission processing in a normal mode.

Next, FIG. 13 is a flowchart describing the processing (transmission processing) in the case of the transmission processing unit 101 in FIG. 10 performing communication with the communication mode in normal mode.

Note that there is a normal mode and learning mode for a communication mode for communication performed by the transmission processing unit 101 and reception processing unit 112 in FIG. 10. With the learning mode, the above-described conversion table is compiled, and with the normal mode, the conversion table thereof is used to perform communication.

With the transmission processing in normal mode, the shift register 151 awaits one bit of the transmission bit string, which is an arrangement of the unit bit string expressing pixel values and so forth of an image for example, to be supplied from the signal processing unit 103 (FIG. 4), and in step S11, the one bit in the transmission bit string is stored and the processing is advanced to step S12.

In step S12, the conversion unit 153 determines whether or not N bits, i.e. the unit bit string, is stored in the shift register 151.

In the case determination is made in step S12 that the unit bit string is not yet stored in the shift register 151, i.e. in the case that fewer than N bits are stored in the shift register 151, the signal processing unit 103 (FIG. 3) awaits the next one bit of the transmission bit string to be supplied to the shift register 151, and the flow is returned to step S11, and similar processing is repeated thereafter.

Also, in the case determination is made in step S12 that the unit bit string is stored in the shift register 151, the flow is advanced to step S13, and the conversion unit 153 determines whether or not the unit bit string stored in the shift register 151 includes significant bits and insignificant bits.

Now, an arrangement is made such that, for example, information as to whether significant bits and insignificant bits are included in the unit bit string stored in the shift register 15 is supplied to the conversion unit 153 from the control unit 104 (FIG. 4), and based on this information, the conversion unit 153 determines whether or not the unit bit string stored in the shift register 151 includes significant bits and insignificant bits.

In the case determination is made in step S13 that unit bit string stored in the shift register 151 includes significant bits and insignificant bits, the flow is advanced to step S14, and the conversion unit 153 converts the unit bit string stored in the shift register 151 into a converted bit string in accordance with the conversion table stored in the conversion table storage unit 152, supplies this to the transmission unit 155, and the flow is advanced to step S15.

On the other hand, in the case determination is made in step S13 that unit bit string stored in the shift register 151 does not include significant bits or insignificant bits, the conversion unit 153 supplies the unit bit string stored in the shift register 151 without change, as a converted bit string, to the transmission unit 155, and the flow skips step S14 and is advanced to step S15.

In step S15, the transmission unit 155 modulates the converted bit string from the conversion unit 153 and transmits the modulated signal obtained by such modulation from the antenna 37*a*, and the flow is advanced to step S16.

In step S16, the conversion unit 153 initializes (clears) the storage content of the shift register 151, and the flow is advanced to step S17.

In step S17, the shift register 151 determines whether or not there are still any transmission bit strings not transmitted.

In the case determination is made in step S17 that there are transmission bit strings not yet transmitted, i.e. in the case a new one bit of the transmission bit string is supplied from the signal processing unit 103 (FIG. 3) to the shift register 151, the flow is returned to step S1, and thereafter similar processing is repeated.

Also, in the case determination is made in step S17 that there are no transmission bit strings not yet transmitted, the transmission processing unit 101 ends the normal mode transmission processing.

Figure 14:
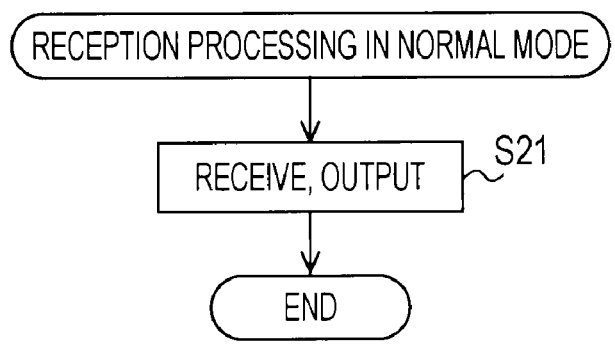
FIG. 14 is a flowchart describing reception processing in a normal mode.

Next, FIG. 14 is a flowchart describing processing (reception processing) in the case of performing communication where the reception processing unit 112 in FIG. 10 performs communication with the communication mode in normal mode.

With the reception processing in normal mode, in step S21, the reception unit 161 receives the modulated signal transmitted from the transmission processing unit 101 via the antenna 36*a*, and demodulates this to a baseband reception signal. Further, the reception unit 161 reproduces the converted bit string by comparing the reception signal and the predetermined threshold, supplies this to the signal processing unit 113 (FIG. 4), and ends reception processing in normal mode.

Figure 15:
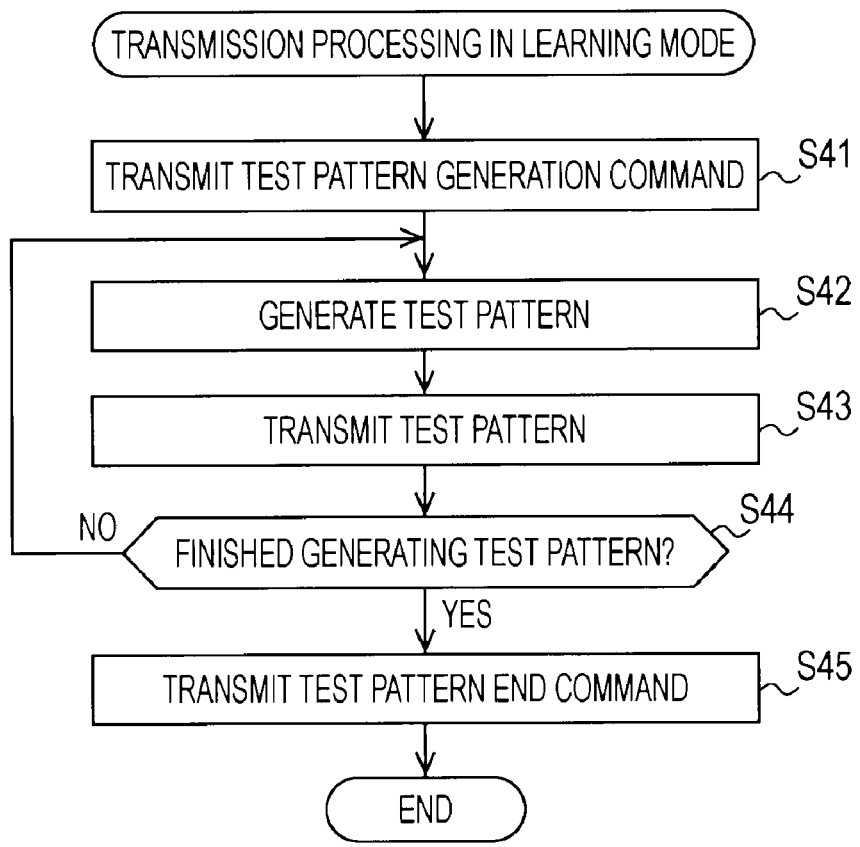
FIG. 15 is a flowchart describing transmission processing in a learning mode.

Next, FIG. 15 is a flowchart describing processing (transmission processing) in the case that the transmission processing unit 101 in FIG. 10 performs communication with the communication mode in learning mode.

As described above, a conversion table is compiled with the learning mode communication. The learning mode communication is performed when the power of the signal processing device 31 (FIG. 2) is turned on, when changes occur to the communication environment within the casing 32 such as a board 34 through 37 is removed, a new board is installed, the positioning of the boards 34 through 37 is changed, and so forth within the casing 32 (FIG. 2), when the error rate of the data received with the reception processing unit 112 exceeds a predetermined threshold with normal mode communication, when there is a command from a user, or at other suitable timings.

With the transmission processing in learning mode, in step S41 the transmission unit 155 transmits a test pattern generating command to request generation of a test pattern from the antenna 37*a* to the reception processing unit 112, and the flow is advanced to step S42.

In step S42, the test pattern generating unit 154 generates a random number of the same N bits as the unit bit string with a predetermined value serving as a seed, for example, and supplies this as a test pattern to the transmission unit 155, and the flow is advanced to step S43.

The value that the test pattern generating unit 154 uses as a seed is included in the test pattern generating command is included in the test pattern generating command and transmitted to the reception processing unit 112 in the above-described step S41. With the reception processing unit 112 (FIG. 10), a random number serving as a test pattern is generated in the test pattern generating unit 163 with the value included in the test pattern generating command as a seed, and thus, being in synch with the test pattern generated by the test pattern generating unit 154 of the transmission processing unit 101, i.e. the same test pattern as that generated by the test pattern generating unit 154 of the transmission processing unit 101, can be obtained in the same order.

In step S43, the transmission unit 155 modulates the test pattern from the test pattern generating unit 154, and the modulated signal obtained by such modulation is transmitted from the antenna 37*a*, and the flow is advanced to step S44.

In step S44, the test pattern generating unit 154 determines whether or not to end generating of test patterns.

In the case determination is made in step S44 to not end the generating of test patterns, the flow is returned to step S42, and similar processing is repeated thereafter.

Also, in the case determination is made in step S44 to end the generation of test patterns, i.e. for example in the case that test patterns are generated the number of times, or the amount of time, sufficient for compilation of the conversion table, the flow is advanced to step S45, the transmission unit 155 transmits a test pattern ending command to request the end of generating test patterns to the reception processing unit 112 from the antenna 37a, and the transmission processing unit 101 ends transmission processing in learning mode.

Figure 16:
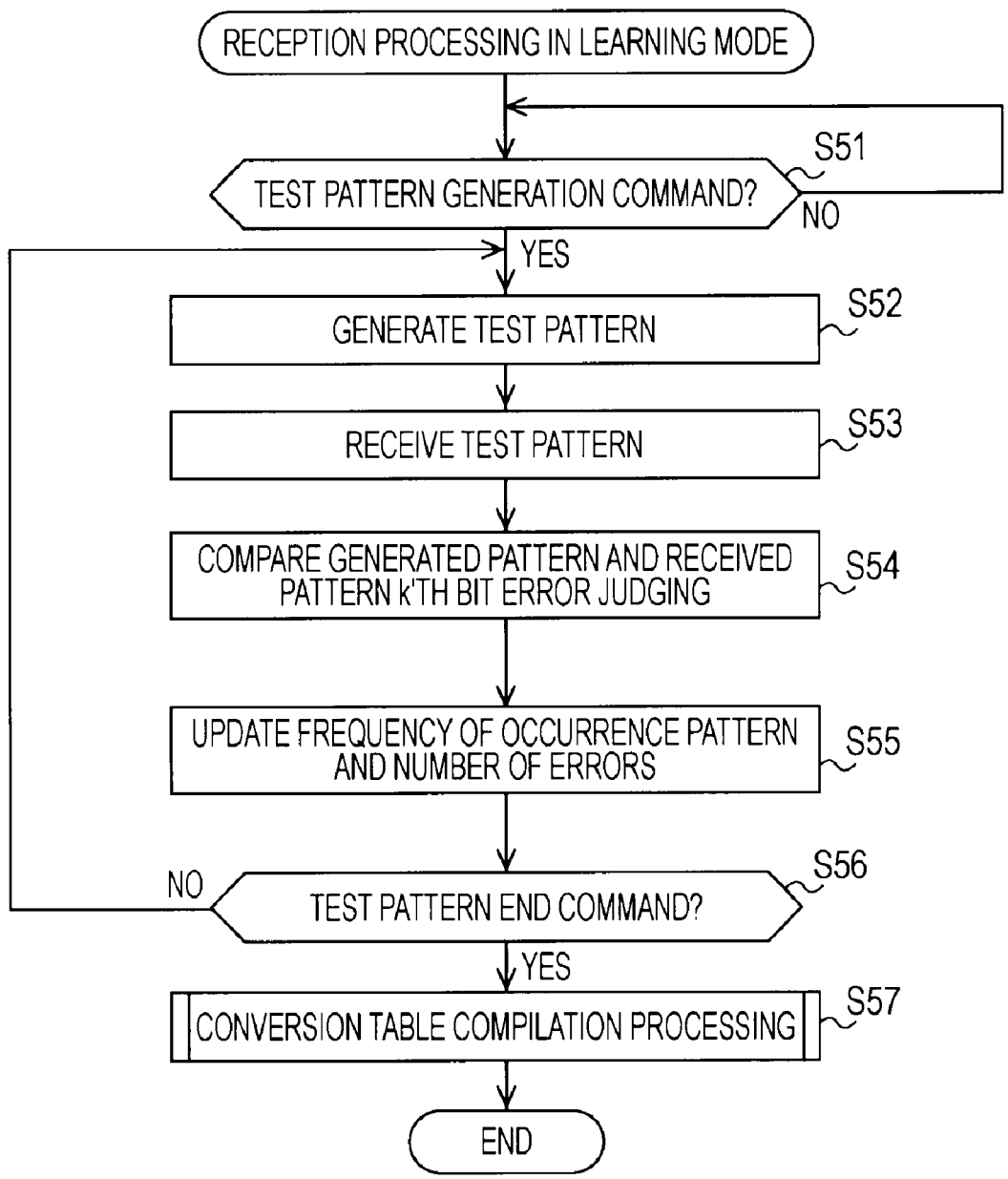
FIG. 16 is a flowchart describing reception processing in a learning mode.

Next, FIG. 16 is a flowchart describing processing (reception processing) in the case that the reception processing unit 112 in FIG. 10 performs communication with the communication mode in learning mode.

With the reception processing in learning mode, in step S51, the compiling unit 162 determines whether the reception unit 161 has received the test pattern generating command, and in the case determination is made that the test pattern generating command is not received, the flow is returned to step S51.

Also, in the case determination is made in step S51 that the reception unit 161 has received the test pattern generating command, i.e. in the case that the bit string output from the reception unit 161, i.e. the reception unit 161, receives the modulated signal transmitted from the transmission processing unit 101 and demodulates this into a baseband reception signal, and further in the case that the bit string reproduced by comparing the reception signal and the predetermined threshold is the test pattern generating command, the flow is advanced to step S52, and the test pattern generating unit 163 generates a random number with the value included in the test pattern generating command serving as a seed, whereby in step S42 in FIG. 15, the same test pattern as that generated by the test pattern generating unit 154 of the transmission processing unit 101 is generated, and supplied to the error rate computing unit 164 as the generating test pattern.

Subsequently, the (modulated signal of the) transmission of the test pattern from the transmission processing unit 101 is awaited, the processing is advanced from step S52 to step S53, and the reception unit 161 receives the test pattern from the transmission processing unit 101 as the reception test pattern and supplies this to the error rate computing unit 164, and the flow is advanced to step S54.

In step S54, the error rate computing unit 164 performs error determination as to whether a k'th bit which is the error detection bit of the test pattern (reception test pattern) ($1 \geq k \geq N$) is in error, by comparing the generated test pattern from the test pattern generating unit 163 and the reception test pattern from the reception unit 161, and the flow is advanced to step S55.

In step S55, the error rate computing unit 164 updates the occurrence frequency and number of errors of the generated test pattern from the test pattern generating unit 163, and the flow is advanced to step S56.

That is to say, in step S55, the error rate computing unit 164 increments the variable expressing the occurrence frequency by one for the generating test pattern from the test pattern generating unit 163. Further, in the case that in step S55, the error determining results in the immediately preceding step S54 express that the k'th bit is in error, the error rate computing unit 164 increments the variable expressing the number of errors by one for the generating test pattern from the test pattern generating unit 163.

Note that the variable expressing the occurrence frequency and the variable expressing the number of errors are initialized (made to be 0) when the reception processing in learning mode is started.

In step S56, the compiling unit 162 determines whether or not the reception unit 161 has received the test pattern ending command, and in the case determination is made of not receiving, the flow is advanced to step S52.

Also, in the case determination is made in step S56 that the reception unit 161 has received the test pattern ending command, i.e. in the case that the bit string output from the reception unit 161, i.e. the reception unit 161, receives the modulated signal transmitted from the transmission processing unit 101 and demodulates this into a baseband reception signal, and further in the case that the bit string reproduced by comparing the reception signal and the predetermined threshold is the test pattern ending command, the flow is advanced to step S57, and the compiling unit 162 performs conversion table compiling processing to compile a conversion table, and the reception processing unit 112 ends the reception processing in learning mode.

Note that in learning mode, the conversion table compiled with the reception processing unit 112 of the functional block 46 is transmitted by low-speed wireless communication or be cable communication from the functional block 46 to the signal router 45, and is stored in the conversion table storage unit 152 with the transmission processing unit 101 of the signal router 45. With the transmission processing unit 101, the conversion table stored in the conversion table storage unit 152 is used for normal mode communication with the reception processing unit 112 of the functional block 46.

Also, communication in learning mode is also performed between the transmission processing unit 101 of the signal router 45 (FIG. 4) and the reception processing unit 112 of the functional block 46, as well as between the transmission processing unit 111 of the functional block 46 and the reception processing unit 102 of the signal router 45, and a conversion table is compiled in the reception processing unit 102. The conversion table compiled with the reception processing unit 102 of the signal router 45 is transmitted to the functional block 46, and is used for normal mode communication with the reception processing unit 102 of the signal router 45 in the transmission processing unit 111 of the functional block 46.

Figure 17:
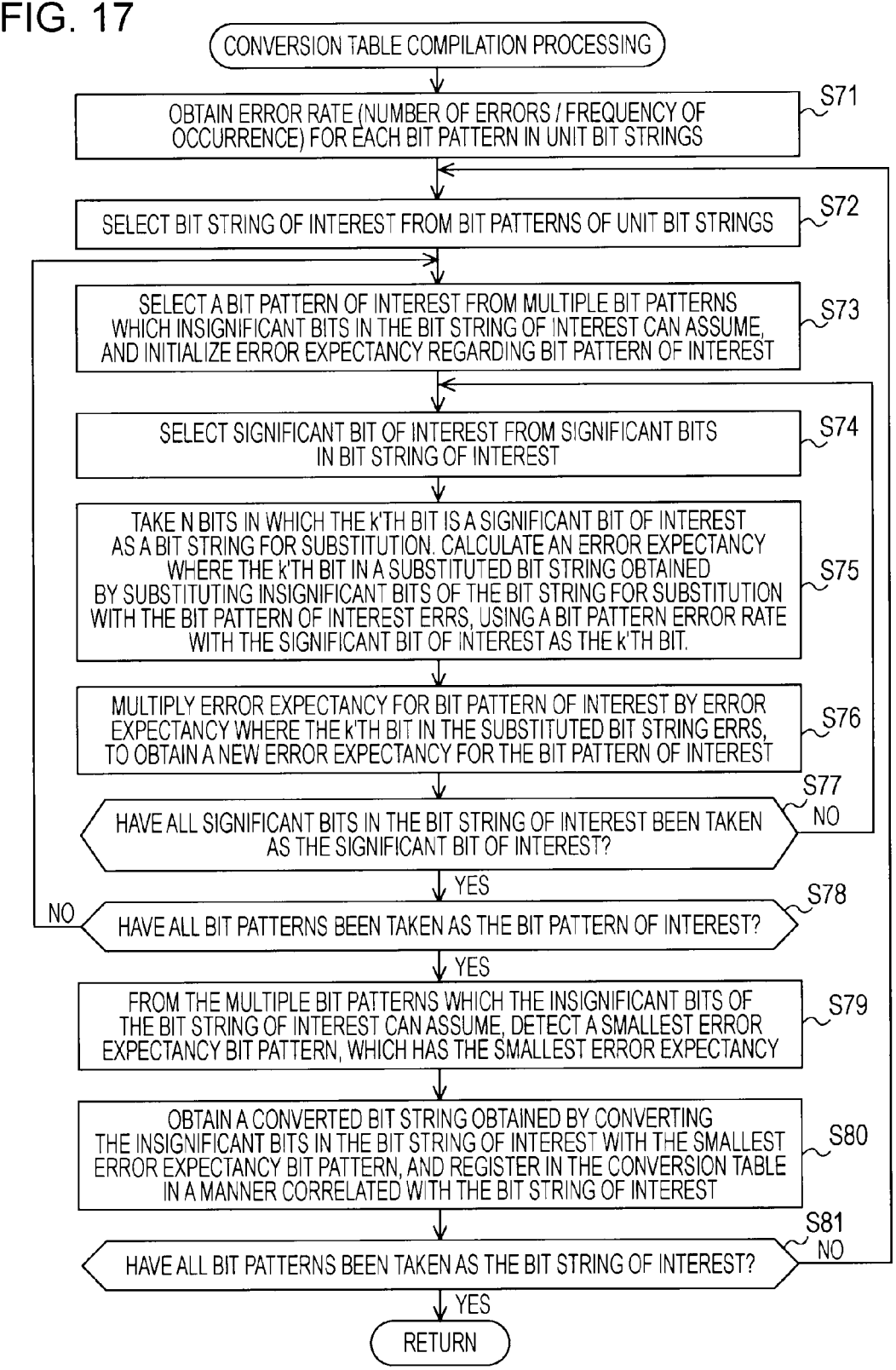
FIG. 17 is a flowchart describing conversion table compiling processing.

Next, the conversion table compiling processing performed in step S57 in FIG. 16 will be described with reference to FIG. 17.

With the conversion table compiling processing, in step S71, for the unit bit string for each bit pattern, the error rate computing unit 164 (FIG. 4) divides the number of errors of the test pattern matching the bit pattern thereof by the occurrence frequency, whereby the divided value is obtained as the error rate of the k'th bit, this is supplied to the error expectancy computing unit 165, and the flow is advanced to step S72.

In step S72, the error expectancy computing unit 165 selects one of the bit patterns that is not a bit string of interest from the bit patterns that can assume a unit bit string of N bits, as a bit string of interest, and the flow is advanced to step S73.

In step S73, the error expectancy computing unit 165 selects a bit string of interest from multiple changed bit patterns which insignificant bits in the bit string of interest can assume, which is not yet a bit pattern of interest, as a bit pattern of interest, and initializes the (variable that expresses the) error expectancy for the bit pattern of interest, i.e. error expectancy that a significant bit of the bit string replacing an insignificant bit of the bit string of interest with a bit pattern of interest will err, and the flow is advanced to step S74.

In step S74, the error expectancy computing unit 165 selects from the significant bits of the bit string of interest, that which is not yet a significant bit of interest, as a significant bit of interest, and the flow is advanced to step S75.

As described with reference to FIGS. 11A through 11F, in step S75, the error expectancy computing unit 165 takes N bits in which the k'th bit is an error detection bit for a significant bit of interest as a bit string for substitution to perform substitution of the insignificant bit, and of the bit string for substitution, the error expectancy that the k'th bit is in error, which is the error detection bit of the substitution bit string obtained by substituting the insignificant bit with a bit pattern of interest, is computed using the error rate of the unit bit string wherein the significant bit of interest from the error rates from the error rate computing unit 164 is the k'th bit, and the flow is advanced to step S76.

As described with reference to FIGS. 11A through 11F, in step S76, the error expectancy that the k'th bit of a substitution bit string obtained in the immediately preceding step S75 errs is integrated in the error expectancy for the bit pattern of interest, whereby the error expectancy computing unit 165 updates the error expectancy for the bit pattern of interest (a new error expectancy is obtained), and the flow is advanced to step S77.

In step S77, the error expectancy computing unit 165 determines whether or not all of the significant bits of the bit string of interest have been made significant bits of interest.

In the case determination is made in step S77 that there are significant bits in the bit string of interest that are not yet a significant bit of interest, the flow is returned to step S74, one of the significant bits of the bit string of interest that is not yet a significant bit of interest is newly selected as the significant bit of interest, and similar processing hereafter is repeated.

Also, in the case determination is made in step S77 that all of the significant bits in the bit string of interest are made to be significant bits of interest, i.e. in the case an error expectancy that each significant bit will err, wherein all of the significant bits of the bit string of interest are significant bits of interest, and further, in the case that the accumulated value of the error expectancy, i.e. the error expectancy for the bit pattern of interest is obtained, the flow is advanced to step S78, and the error expectancy computing unit 165 determines whether or not all of the multiple changed bit patterns that the insignificant bits of the bit string of interest can assume are bit patterns of interest.

In the case determination is made in step S78 that there is a bit pattern in the multiple changed bit patterns that are not yet a bit pattern of interest, the flow is returned to step S73, and one of the bit patterns of the multiple changed bit patterns that is not yet a focus bit pattern is newly selected as the bit pattern of interest, and hereafter similar processing is repeated.

Also, in the case determination is made in step S78 that all of the multiple changed bit patterns that the insignificant bits of the bit string of interest can assume are a bit pattern of interest, i.e. in the case that an error expectancy is obtained for each of the multiple changed bit patterns the insignificant bits of the bit string of interest can assume, the error expectancy computing unit 165 supplies the error expectancy for each of the multiple changed bit patterns thereof to the conversion table compiling unit 166, and the flow is advanced to step S79.

In step S79, the conversion table compiling unit 166 obtains a smallest error expectancy bit pattern based on the error expectancies for each of the multiple changed bit patterns which are obtained as to the bit string of interest, from the error expectancy computing unit 165, and the flow is advanced to step S80.

That is to say, the conversion table compiling unit 166 selects a changed bit pattern wherein the error expectancy from the error expectancy computing unit 165 is smallest, from the multiple changed bit patterns that the insignificant bits of the bit string of interest can assume, as the smallest error expectancy bit pattern.

In step S80, the conversion table compiling unit 166 obtains a converted bit string which is obtained by converting the insignificant bit of the bit string of interest into a smallest error expectancy bit pattern, the converted bit string thereof is correlated with the bit string of interest, and is registered (written) in the conversion table, and the flow is advanced to step S81.

In step S81, the error expectancy computing unit 165 determines whether or not all of the bit patterns that the unit bit string of N bits can assume have become a bit string of interest.

In the case determination is made in step S81 that there are bit patterns that can assume an N-bit unit bit string, which are not yet a bit string of interest, the flow is returned to step S72, and a bit pattern from the bit patterns that the bit patterns can assume an N-bit unit bit string, and a bit pattern that is not a bit string of interest, are newly selected as bit string of interest, and similar processing is repeated hereafter.

Also, in step S81, in the case determination is made that all of the bit patterns that can assume the unit bit string of N bits are determined as a bit string of interest, the flow is returned.

Thus, with the compiling unit 162 (FIG. 10), the error rate that the k'th bit will err is obtained for a test pattern which is an N-bit bit pattern that assume a unit bit string, and the error expectancy of the significant bits of the N bits in the unit bit string is obtained using the error rate of the test pattern wherein the significant bit of the N bits in the unit bit string is the k'th bit, for each of the multiple changed bit patterns that the insignificant bit can assume. Further, with the compiling unit 162, a conversion table is compiled which correlates the unit bit string and the converted bit string which is obtained by converting the insignificant bit of the unit bit string thereof into a smallest error expectancy bit pattern of the multiple changed bit patterns.

With the transmission processing unit 101, the unit bit string is converted to the converted bit string and transmitted, according to the conversion table compiled with the compiling unit 162.

Accordingly, although the insignificant bit is sacrificed, but the unit bit string is converted to a converted bit string where errors to the significant bits do not occur readily in a multipath environment and transmitted, whereby occurrences to the errors of the significant bits resulting from multipath can be easily prevented.

That is to say, with the unit bit string, the insignificant bits are converted, but the significant bits can be transmitted with more certainty. This is particularly useful when transmitting a bit in a secure manner, even when communication quality is poor, wherein the influence is great when compared to and mistaken for another bit, such as a synchronized bit portion in an environment with no retransmitting or a MSB portion of the pixel value of the image.

Next, the above-described series of processing can be performed with hardware or can be performed with software. In the case of performing the series of processing with software, a program making up the software is installed in a general-use computer or the like.

Figure 18:
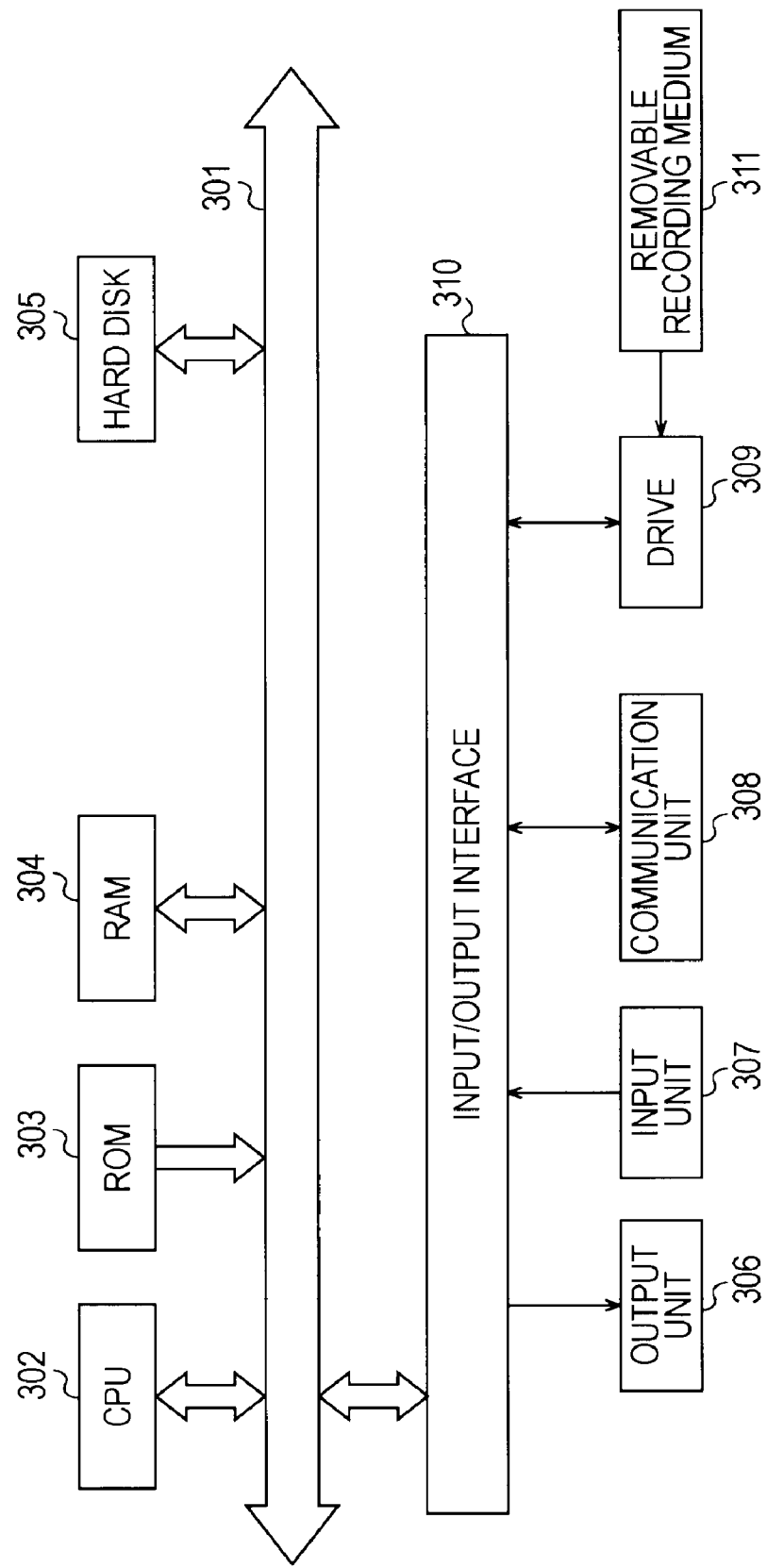
FIG. 18 is a block diagram illustrating a configuration example of an embodiment of a computer to which the present invention is applied.

FIG. 18 shows a configuration example of an embodiment of a computer wherein a program to execute the above-described series of processing is executed.

A program can be stored in a hard disk 305 or ROM 303 serving as the recording medium built into the computer. Alternatively, the program can temporarily or permanently be stored in a removable recording medium 311 such as a flexible disk, CD-ROM (Compact Disc Read Only Memory), MO (Magneto optical) disk, DVD (Digital Versatile Disc), magnetic disk, semiconductor memory, and the like. Such a removable recording medium 311 can be provided as so-called packaged software.

Note that the program may be installed in the computer from the removable recording medium 311 as described above, but also can be transferred wirelessly to the computer, from a download site, via a digital broadcasting artificial satellite, or transferred by cable to a computer via a network such as a LAN (Local Area Network) or the Internet, with the computer receiving the program transmitted thus with a communication unit 308, and installing this in the built-in hard disk 305.

The computer has a built-in CPU (Central Processing Unit) 302. The CPU 302 is connected to an input/output interface 310, via a bus 301, and upon a command input by a user operating an input unit 307 made up of a keyboard, mouse, microphone, or the like, via the input/output interface 301, the program stored in the ROM (Read Only Memory) 303 is executed in accordance therewith. Alternatively, the CPU 302 executes a program stored in the hard disk 305, a program transferred from a satellite or network and installed on the hard disk 305 that is received with the communication unit 308, or a program read out from the removable recording medium 311 mounted on a drive 309 and installed in the hard disk 305 is loaded on the RAM (Random Access memory) 304. Accordingly, the CPU 302 performs processing according to the above-described flowchart, or processing performed with the configuration of the above-described block diagram. The CPU 302 outputs the processing results thereof, as appropriate, for example via the input/output interface 310 from an output unit 306 made up of an LCD (Liquid Crystal Display) or a speaker or the like, of whether recording or the like can be made of a transmission from the communication unit 308, and further the recording onto a hard disk 305.

With the present specification, the processing steps described in program for causing the compute to perform various types of processing are not restricted to processing in time-series following the description of the flowchart, and may include processing that is executed in parallel or individually (e.g. parallel processing or processing by object).

Also, the program may be processed with one computer, or may be subject to dispersion processing by multiple computers. Further, an arrangement may be made wherein the program is transferred to a remote computer and executed.

Thus, a situation is described wherein the present invention is applied to communication performed within the casing 32, but the present invention may be applied to other communication such as communication via a wireless LAN performed in an apartment building or single-family home, or a harness or cable between boards in an electronic device wherein the manner of reflecting the radio waves does not change with time, communication via a communication cable used for telegraph/telephone, a fixed wireless communication representative of wireless communication between buildings wherein multipath does not change greatly because the wireless station is fixed, and other communication wherein a constant error occurs, wherein the communication environment is fixed for a certain amount of time, and errors occur. By applying the present invention to such communication, multipath interference occurring by the reflection or diffraction of the signal transmitted on the transmission side, in a communication path with interference due to reflection in a cable, occurrences of errors to the significant bits can be readily prevented, and therefore communication quality of the significant bits can be improved.

Note that the embodiments of the present invention are not limited to the above-described embodiments, and various types of modifications may be made within the scope and spirit of the present invention.

That is to say, with the present embodiment, the image (pixel value) is the subject of transmission, but an arrangement may be made for a bit string subject to transmission, wherein other than the image, a small amount of sacrifice is permitted as to the lower bits, e.g. music audio data may be employed.

Also, the present invention can be applied to communication between LSIs, besides between boards.

Further, with the present embodiment, an arrangement is made wherein the conversion table is compiled with the reception processing unit 112, but an arrangement may be made wherein the conversion table is compiled with the transmission processing unit 101. That is to say, for example, the error rate computed from the reception processing unit 112 by the error rate computing unit 164, or the error rate computed by the error expectancy value computing unit 165 is transmitted to the transmission processing unit 101, and with the transmission processing unit 101, the error rate computed by the error rate computing unit 164 from the reception processing unit 112 or the error expectancy computed by the error expectancy computing unit 165 is transmitted to the transmission processing unit 101, and using the error rate or the error expectancy, a conversion table can be compiled.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device configured to transmit a transmission bit string which is an arrangement of a unit bit string of N bits which is a plurality of bits, said transmission device comprising:

conversion means configured to convert the unit bit string into a converted bit string in accordance with a conversion table obtained by obtaining an error rate wherein a k'th bit out of said N bits is in error for a test pattern which is a bit pattern of N bits that can assume said unit bit string;

obtaining an error expectancy which is an expectancy that a significant bit of the N bits in said unit bit string will err, for each of a plurality of bit patterns that an insignificant bit, which is a bit that is not significant, can assume of the N bits of said unit bit string, using said error rate of said test pattern wherein said significant bit of the N bits in said unit bit string is the k'th bit; and creating a conversion table that correlates said unit bit string and a converted bit string obtained by converting said insignificant bit of the unit bit string to a smallest error expectancy bit pattern which is a bit pattern that minimizes said error expectancy of said plurality of bit patterns; and transmission means configured to transmit said converted bit string.

2. The transmission device according to claim 1, wherein said unit bit string is a bit string expressing a pixel value;

wherein said significant bit is a higher-order bit of a bit string expressing said pixel value; and wherein said insignificant bit is a lower-order bit of a bit string expressing said pixel value.

3. A transmission method for a transmission device configured to transmit a transmission bit string which is an arrangement of a unit bit string of N bits which is a plurality of bits, comprising:

converting said unit bit string into a converted bit string in accordance with a conversion table obtained by said transmission device obtaining an error rate wherein a k'th bit out of said N bits is in error for a test pattern which is a bit pattern of N bits that can assume said unit bit string;

obtaining an error expectancy which is an expectancy that a significant bit of the N bits in said unit bit string will err, for each of a plurality of bit patterns that an insignificant bit, which is a bit that is not significant, can assume of the N bits of said unit bit string, using said error rate of said test pattern wherein said significant bit of the N bits in said unit bit string is the k'th bit; and creating a conversion table that correlates said unit bit string and a converted bit string obtained by converting said insignificant bit of the unit bit string to a smallest error expectancy bit pattern which is a bit pattern that minimizes said error expectancy of said plurality of bit patterns; and transmitting said converted bit string.

4. A non-transitory computer readable storage medium storing a program to cause a computer to function as a transmission device configured to transmit a transmission bit string which is an arrangement of a unit bit string of N bits which is a plurality of bits, which when executed by the computer, causes the computer to perform a method comprising:

converting said unit bit string into a converted bit string in accordance with a conversion table obtained by said transmission device obtaining an error rate wherein a k'th bit out of said N bits is in error for a test pattern which is a bit pattern of N bits that can assume said unit bit string;

obtaining an error expectancy which is an expectancy that a significant bit of the N bits in said unit bit string will err, for each of a plurality of bit patterns that an insignificant bit, which is a bit that is not significant, can assume of the N bits of said unit bit string, using said error rate of said test pattern wherein said significant bit of the N bits in said unit bit string is the k'th bit; and creating a conversion table that correlates said unit bit string and a converted bit string obtained by converting said insignificant bit of the unit bit string to a smallest error expectancy bit pattern which is a bit pattern that minimizes said error expectancy of said plurality of bit patterns; and transmitting said converted bit string.

5. An information processing device configured to compile a conversion table used to convert a unit bit string of N bits, which is a plurality of bits, into a predetermined converted bit string, said information processing device comprising:

error rate computing means configured to obtain an error rate where a k'th bit of said N bits of a test pattern errs, by comparing a test pattern generated by test pattern generating means that generate a test pattern which is a bit pattern of the N bits that can assume said unit bit string and a received test pattern obtained by receiving said test pattern transmitted by a transmission device that transmits test patterns;

an error expectancy computing unit configured to obtain an error expectancy which is an expectancy that a significant bit of the N bits in said unit bit string errs, for each of a plurality of bit patterns that an insignificant bit can assume, which is bit that is not significant, of the N bits in said unit bit string, using said error rate of said test pattern wherein said significant bit of the N bits in said unit bit string is the k'th bit; and conversion table compiling means configured to compile a conversion table correlating said unit bit string with a converted bit string obtained by converting said insignificant bit of the unit bit string to a smallest error expectancy bit pattern which is a bit pattern that minimizes said error expectancy of said plurality of bit patterns.

6. The information processing device according to claim 5, wherein said unit bit string is a bit string expressing a pixel value;

wherein said significant bit is a higher-order bit of a bit string expressing said pixel value; and wherein said insignificant bit is a lower-order bit of a bit string expressing said pixel value.

7. An information processing method of an information processing device configured to compile a conversion table used to convert a unit bit string of N bits, which is a plurality of bits, into a predetermined converted bit string, said information processing method comprising:

obtaining an error rate where a k'th bit of said N bits of a test pattern errs, by comparing a test pattern generated by a test pattern generating unit that generates a test pattern which is a bit pattern of the N bits that can assume said unit bit string and a received test pattern obtained by receiving said test pattern transmitted by a transmission device that transmits test patterns;

obtaining an error expectancy which is an expectancy that a significant bit of the N bits in said unit bit string errs, for each of a plurality of bit patterns that an insignificant bit can assume, which is a bit that is not significant, of the N bits in said unit bit string, using said error rate of said test pattern wherein said significant bit of the N bits in said unit bit string is the k'th bit; and compiling a conversion table correlating said unit bit string with a converted bit string obtained by converting said insignificant bit of the unit bit string to a smallest error expectancy bit pattern which is a bit pattern that minimizes said error expectancy of said plurality of bit patterns.

8. A non-transitory computer readable storage medium storing a program to cause a computer to function as an information processing device configured to compile a conversion table used to convert a unit bit string of N bits, which is a plurality of bits, into a predetermined converted bit string, which when executed by the computer, causes the computer to perform a method comprising:

obtaining an error rate where a k'th bit of said N bits of a test pattern errs, by comparing a test pattern generated by a test pattern generating unit that generates a test pattern which is a bit pattern of the N bits that can assume said unit bit string and a received test pattern obtained by receiving said test pattern transmitted by a transmission device that transmits test patterns;

obtaining an error expectancy which is an expectancy that a significant bit of the N bits in said unit bit string errs, for each of a plurality of bit patterns that an insignificant bit can assume, which is bit that is not significant, of the N bits in said unit bit string, using said error rate of said test pattern wherein said significant bit of the N bits in said unit bit string is the k'th bit; and compiling a conversion table correlating said unit bit string with a converted bit string obtained by converting said insignificant bit of the unit bit string to a smallest error expectancy bit pattern which is a bit pattern that minimizes said error expectancy of said plurality of bit patterns.

9. A transmission device configured to transmit a transmission bit string which is an arrangement of a unit bit string of N bits which is a plurality of bits, said transmission device comprising:

a conversion unit configured to convert the unit bit string into a converted bit string in accordance with a conversion table obtained by obtaining an error rate wherein a k'th bit out of said N bits is in error for a test pattern which is a bit pattern of N bits that can assume said unit bit string;

obtaining an error expectancy which is an expectancy that a significant bit of the N bits in said unit bit string will err, for each of a plurality of bit patterns that an insignificant bit, which is a bit that is not significant, can assume of the N bits of said unit bit string, using said error rate of said test pattern wherein said significant bit of the N bits in said unit bit string is the k'th bit; and creating a conversion table that correlates said unit bit string and a converted bit string obtained by converting said insignificant bit of the unit bit string to a smallest error expectancy bit pattern which is a bit pattern that minimizes said error expectancy of said plurality of bit patterns; and a transmission unit configured to transmit said converted bit string.

10. A non-transitory computer readable storage medium storing a program to cause a computer to function as a transmission device configured to transmit a transmission bit string which is an arrangement of a unit bit string of N bits which is a plurality of bits, which when executed by the computer, causes the computer to perform a method comprising:

converting said unit bit string into a converted bit string in accordance with a conversion table obtained by obtaining an error rate wherein a k'th bit out of said N bits is in error for a test pattern which is a bit pattern of N bits that can assume said unit bit string;

obtaining an error expectancy which is an expectancy that a significant bit of the N bits in said unit bit string will err, for each of a plurality of bit patterns that an insignificant bit, which is a bit that is not significant, can assume of the N bits of said unit bit string, using said error rate of said test pattern wherein said significant bit of the N bits in said unit bit string is the k'th bit; and creating a conversion table that correlates said unit bit string and a converted bit string obtained by converting said insignificant bit of the unit bit string to a smallest error expectancy bit pattern which is a bit pattern that minimizes said error expectancy of said plurality of bit patterns; and transmitting said converted bit string.

11. An information processing device configured to compile a conversion table used to convert a unit bit string of N bits, which is a plurality of bits, into a predetermined converted bit string, said information processing device comprising:

an error rate computing unit configured to obtain an error rate where a k'th bit of said N bits of a test pattern errs, by comparing a test pattern generated by a test pattern generating unit that generate a test pattern which is a bit pattern of the N bits that can assume said unit bit string and a received test pattern obtained by receiving said test pattern transmitted by a transmission device that transmits test patterns;

an error expectancy computing unit configured to obtain an error expectancy which is an expectancy that a significant bit of the N bits in said unit bit string errs, for each of a plurality of bit patterns that an insignificant bit can assume, which is bit that is not significant, of the N bits in said unit bit string, using said error rate of said test pattern wherein said significant bit of the N bits in said unit bit string is the k'th bit; and a conversion table compiling unit configured to compile a conversion table correlating said unit bit string with a converted bit string obtained by converting said insignificant bit of the unit bit string to a smallest error expectancy bit pattern which is a bit pattern that minimizes said error expectancy of said plurality of bit patterns.

12. A non-transitory computer readable storage medium storing a program to cause a computer to function as an information processing device configured to compile a conversion table used to convert a unit bit string of N bits, which is a plurality of bits, into a predetermined converted bit string, which when executed by the computer, causes the computer to perform a method comprising:

obtaining an error rate where a k'th bit of said N bits of a test pattern errs, by comparing a generated test pattern which is a bit pattern of the N bits that can assume said unit bit string and a received test pattern obtained by receiving said test pattern transmitted by a transmission device that transmits test patterns;

obtaining an error expectancy which is an expectancy that a significant bit of the N bits in said unit bit string errs, for each of a plurality of bit patterns that an insignificant bit can assume, which is bit that is not significant, of the N bits in said unit bit string, using said error rate of said test pattern wherein said significant bit of the N bits in said unit bit string is the k'th bit; and compiling a conversion table correlating said unit bit string with a converted bit string obtained by converting said insignificant bit of the unit bit string to a smallest error expectancy bit pattern which is a bit pattern that minimizes said error expectancy of said plurality of bit patterns.

* * * * *